(12) United States Patent
Ritzel

(10) Patent No.: US 6,904,407 B2
(45) Date of Patent: Jun. 7, 2005

(54) REPOSITORY FOR JOBSEEKERS' REFERENCES ON THE INTERNET

(75) Inventor: William D. Ritzel, 5325 Sandy Point La., Clifton, VA (US) 20124-0943

(73) Assignee: William D. Ritzel, Las Vegas, NV (US)

( * ) Notice: Subject to any disclaimer, the term of this patent is extended or adjusted under 35 U.S.C. 154(b) by 803 days.

(21) Appl. No.: 09/960,512

(22) Filed: Sep. 24, 2001

(65) Prior Publication Data

US 2002/0049774 A1 Apr. 25, 2002

Related U.S. Application Data

(60) Provisional application No. 60/241,369, filed on Oct. 19, 2000.

(51) Int. Cl.$^7$ .............................................. G06F 17/60
(52) U.S. Cl. ........................................................ 705/1
(58) Field of Search ...................................... 705/1, 34

(56) References Cited

U.S. PATENT DOCUMENTS

| | | | |
|---|---|---|---|
| 5,758,324 A | 5/1998 | Hartman et al. |
| 5,864,871 A | 1/1999 | Kitain et al. |
| 5,884,270 A | 3/1999 | Walker et al. |
| 5,978,768 A | 11/1999 | McGovern et al. |
| 6,026,374 A | 2/2000 | Chess |
| 6,029,149 A | 2/2000 | Dykstra et al. |
| 6,064,980 A | 5/2000 | Jacobi et al. |
| 6,385,620 B1 * | 5/2002 | Kurzius et al. ......... 707/104.1 |

FOREIGN PATENT DOCUMENTS

JP 2004302972 A * 10/2004 ........... G06F/12/00

OTHER PUBLICATIONS

Proquest article Recruit.com Announces Van Ella Alliance for Online Candidate Background Checks. BusinessWire Sep. 7, 2000.*

* cited by examiner

*Primary Examiner*—John Weiss
*Assistant Examiner*—Traci Smith
(74) *Attorney, Agent, or Firm*—Litman Law Offices Ltd.

(57) ABSTRACT

An electronic repository for jobseekers' references on the Internet. The jobseeker registers himself and his reference sources on an Internet site. The references are notified via e-mail, they subsequently log in and enter their personal or professional reference or letter of reference for the jobseeker. The jobseeker gives perspective Recruiters/Employers information on accessing his references. The list of references is available at no charge, but the detail of the reference document can be purchased by the Recruiter/Employer. All required security is implemented. The advantages of this process include: (1) elimination of repeated contact of jobseekers' references for positions that change frequently; (2) virtually instant checking of references, eliminating loss of potential employee through extended process; and (3) significant reduction in cost and time of checking reference by recruiter/Employer.

20 Claims, 31 Drawing Sheets

REFERENCEDEPOT.com
*"Checking references couldn't be faster or easier!"*
The #1 Access Point for all your References From: <referencebot@referencedepot.com>
Sent: Wed, 14 Aug 2001 12:58:04 -0400
To: <frankwhite@referencedepot.com>
Subject: Reference for Jane Black Hello Frank White, You have been registered as a Reference Giver for Jane Black on the ReferenceDepot.com website. In order to speed up the hiring process and reduce the number of phone calls to you, you may login to this site and enter your reference information. Of course, this doesn't mean that you won't receive any phone calls, but it will alleviate some of the effort of reference checking.

Once you login and provide reference information, you will be asked to submit it. Once submitted, the information on a reference cannot be changed. This is a security feature to prevent anyone from modifying the reference information that you provide. Please review the questions thoroughly before you submit the reference We hope that you enjoy, and will continue to use ReferenceDepot.com What you do:
1.) Go to http://www.ReferenceDepot.com
2.) Click on the "References Button" on the Home Page.
3.) Enter the following information on the Reference Login Screen:
   JobseekerID: 46059
   Password: u23hkepx
4.) Follow the instructions and answer the questions to complete the reference for Jane Black.

Thank you,
The Reference Depot Team

*Fig. 4G*

REFERENCEDEPOT.com
*"Checking references couldn't be faster or easier!"*

The #1 Access Point for all your References

What do you do now? Ask your potential Employers and Recruiters to use this acount number to access your references. We suggest that you put this at the bottom of your resume:

*References Available on ReferenceDepot.com (Account#: 25918)*

Thank you for registering and entering your
Reference Givers with ReferenceDepot.com!

Home    FAQs    Contact Us

Copyright ©2000 RefDep Inc
Patent Pending
Terms Of Use

Developed by MDA Technologies *Information Solutions*

Fig. 4H

REFERENCEDEPOT.com
*"Checking references couldn't be faster or easier!"*
The #1 Access Point for all your References

Reference List for Jane Black

Add a Reference Giver — 213
View/Modify Your Personal Info — 214

| Availability | Name (click to edit) | Address | Phone | E-mail & Status |
|---|---|---|---|---|
| ⦿ Available<br>○ Hidden | John Black<br>Film Studio Star<br>✎ Edit | 1 Blvd Avenue<br>Los Angeles, CA 99119 US | Work: 555-222-3333 | johnblack@referencedepot.com<br>Reference Completed — 223 |
| ⦿ Available<br>○ Hidden | Frank Doe<br>Film Studio<br>✎ Edit | 123 Star Avenue<br>Star City, VA 12345 USA | Work: 555-999-8888 | fdoe@referencedepot.com<br>Notify Reference — 221 |

220 ⟶ (Availability column)
224 ⟶ (Edit link)
222 ⟶ Accept and Continue | Help

Not all of your References Givers listed have supplied references. Please notify Reference Givers again by clicking the "Notify Reference" button.

Home    FAQ's    Contact Us

REFERENCEDEPOT.com
*"finding a reference couldn't be any easier!"*
The #1 Repository for All Your References

Please answer the following questions.

Press Submit when you are satisfied with your answers

You will not be able to edit these answers after you submit them, so take your time or come back later when you are ready When did Bob Lyons work with you?
(Example: March 1997 through June 1999)

`January 1998 through July 2000`

On a range of 1 to 5, with 1 = inept and 5 = a master, how would you rate Bob Lyons as a Attorney?
(Leave blank if you have no basis to rate the person with respect to this position)

`4`

Provide at least one example in detail which would support your rating in the previous question of Bob Lyons as a Attorney `Bob is very good wit...`

Describe the work habits of this individual (attendance, ability to work with others, etc.)

`Bob is very dependable,`

What are Bob Lyons's strengths?

REFERENCEDEPOT.com
*"Finding a reference couldn't be any easier!"*
The #1 Repository for All Your References

Please answer the following questions.

Press Submit when you are satisfied with your answers

You will not be able to edit these answers after you submit them, so take your time or come back later when you are ready Please paste or type your letter of reference for .

```
To Whom It May Concern:
Ms. Bevery Smith was an employee of ........
...................................................
...................................................
...................................................
...................................................
...................................................
```

[Submit] [Reset]

Home Page     Common Questions     Contact Us

Copyright ©2000 ReferenceDepot.Com
Terms Of Use

*MDA Technologies*
Developed by MDA Technologies

REFERENCEDEPOT.com
*"finding a reference couldn't be any easier."*

The #1 Repository for All Your References

Welcome to ReferenceDepot.Com.

Reference Information For:

Bob Lyons
Attorney
123 Maple St
Arlington, VA 22215 (USA)

| Purchase | Name | Address | Phone | Email |
|---|---|---|---|---|
| | | | Home: 703-555-5555 Work: Fax: | rlyons@yahoo.com |
| ☑ | Jane Doe President Doe Enterprises | 123 Main Fairfax, VA 20111 USA | 703-555-1233(W) 705-555-1111(H) 703-555-1112 (Fax) | janedoe@test.com |

236 — Purchase Checked References

237 — Back To Recruiter/Employer Menu

Home Page  Common Questions  Contact Us

Copyright ©2000 ReferenceDepot.Com
Terms Of Use

*MDA Technologies*
Developed by MDA Technologies

REPOSITORY FOR JOBSEEKERS' REFERENCES ON THE INTERNET

CROSS-REFERENCE TO RELATED APPLICATION

This application claims the benefit of U.S. Provisional Patent Application Ser. No. 60/241,369, filed Oct. 19, 2000.

BACKGROUND OF THE INVENTION

1. Field of the Invention

The present invention relates to a method for employing an Internet web site to conduct business and, more particularly, to the employment of a Website to register the references of jobseekers for access to letters of recommendation by prospective employers.

2. Description of the Related Art

One aspect of the job seeking process which can be a source of delay in the hiring process is the reference list. For the jobseeker (also job seeker), updating the reference list is a constant chore and may require reprinting of the resume on expensive paper in significant numbers, leading to time consumption and added cost in the job seeking activity. Likewise, the reference provider may likely be contacted many times, becoming a source of annoyance to the reference provider. The process of contacting of the reference provider by the prospective employer can also be a significant source of delay.

There are presently in existence a number of Internet Websites which provide access by a prospective employer to obtain relevant resumes from jobseekers. Examples include America"s Talent Bank at http://WWW.atb.org., Careersite.com at http://WWW.careersite.com/, and HeadHunter.net at http://WWW.headhunter.net/ Also, many prospective employers maintain Internet Websites for receiving resumes from jobseekers.

U.S. Pat. No. 5,758,324, issued May 26, 1998, to Hartman et al., U.S. Pat. No. 5,884,270, issued Mar. 16, 1999, to Walker et al., and U.S. Pat. No. 5,978,768, issued on Mar. 16, 1999, to McGovern et al. describe computerized systems for resume storage and retrieval, useful in an Internet system.

Internet on-line referral systems have been the subject of existing patents. U.S. Pat. No. 5,864,871, issued on Jan. 26, 1999, to Kitain et al. describes an information delivery system wherein one or more second parties (brokerage firms) place information about a first party (a corporation) in a database for viewing by third parties (users). The depositors control who has access to the information, and where the deposit and access of information occur on separate computers in a distributed system. U.S. Pat. No. 6,064,980, issued May 16, 2000, to Jacobi et al., describes a computerized Internet system for recommendations of literary works. U.S. Pat. No. 6,026,374, issued Feb. 15, 2000 to Chess, D. describes a computerized system for generating trusted descriptions of products wherein one or more second parties place information about a first party's product in a node of a network for view by a third party and wherein the database controls the information released to the general public. U.S. Pat. No. 6,029,149, issued on Feb. 22, 2000, to Dykstra et al. describes an analysis of service providers wherein one or more second parties (credit bureaus) place information about a first party (a loan applicant) in a computer for inspection by a third party (a lender), and wherein the information is operated on to present an evaluation.

The present invention is a system and methodology embodied in an Internet Website and associated hardware and software. The problem to overcome, as discussed above, is that of a person, such as a consultant, who, by nature of his frequently changing positions has his references checked repeatedly. The number of times his references are called becomes somewhat annoying to the reference givers. The consultant also has the burden of giving references for a number of his associates, leading one to the realization that the same questions are asked and answered each time a reference is checked. Contacting the references always seems to be a problem, i.e. endless telephone tag.

The jobseekers cannot be hired without the references, so both the employer and prospective employee are held up until the process is completed. The consultant reasons that if the references are readily available in a formatted, machine-readable form that recruiters, employers and jobseekers would all benefit. One of the most inefficient, time consuming and costly parts of the hiring process would be obviated.

The inventive Website operates on the basis that there are three categories of potential users, recruiters/employers, jobseekers, and Reference Sources. The jobseeker is assigned a user identification (ID) and password which allows him access to his demographic information and list of Reference Sources. The website assigns a unique user ID and password for each Reference Source Next, the Reference Sources enter the assigned User ID and password, and are asked to answer a series of questions about the jobseeker. This is basically the same as responding to a phone call, but at the Reference Sources' convenience.

The jobseeker then gives the recruiter/employer an account number, and that person can enter the site to retrieve the references. The Recruiter/Employer can always randomly verify one or more of the references via telephone, or purchase the complete reference text right off the Website. The reference documents selected are formatted and e-mailed immediately to the Recruiter/Employer.

Advantages of the Website are that the reference giver has time to consider his answer and think of examples and situations that typify the jobseeker's actions and capabilities. Since the recruiter or prospective employer doesn't need to take notes during a telephone conversation and type them up, the inventive Website is a faster, easier, more accurate, and less expensive way to ensure reliable references. References are available almost instantly, twenty-four hours a day, so there is no delay in the hiring process.

The cost of using the inventive website is not passed to the jobseeker or to the Reference Source, but to the prospective Recruiter/Employer. A list of references available is available on the Website cost free. If an employer wants the detail of the reference, they pay a very nominal fee, certainly less than their time and phone bill, for obtaining basically the same answers.

The Inventive Website will be useful to the Recruiter/Employer as an alternative to them setting up their own Website, because of they need a reference only once. The jobseeker, however, may want multiple employers to view the references. Use of the inventive Website eliminates multiple telephone calls to his references, along with the other advantages presented above.

None of the above inventions and patents, taken either singularly or in combination, is seen to describe the instant invention as claimed. Thus a repository for jobseekers' references on the Internet solving the aforementioned problems is desired.

SUMMARY OF THE INVENTION

An electronic repository for jobseekers' references is desired. The jobseeker registers himself and his reference sources on an Internet site. The references are notified via e-mail. they subsequently log in (Login) and enter their personal or professional reference or letter of reference for the jobseeker. The jobseeker gives perspective Recruiters/Employers information on accessing his references. The list of references is available at no charge, but the detailed document of the references can be purchased by the Recruiter/Employer. All required security, known in the art, is implemented. The advantages of this process include, (1) elimination of repeated contact of jobseekers' references for positions that change frequently; (2) virtually instant checking of references, eliminating loss of potential employee through extended process; and (3) significant reduction in cost and time of checking reference by recruiter/employee.

Accordingly, it is a principal object of the invention to provide an Internet site for registration of jobseekers' references.

It is another object of the invention to provide an Internet site as above where jobseekers may update their references.

It is a further object of the invention to provide an Internet site as above where listed references are e-mailed a request for a professional or personal reference letter and are encouraged to enter such letter into the Internet site for storage in a data repository.

Still another object of the invention is to provide an Internet site as above which provides a list of references for a particular jobseeker to an inquiring employer or recruiter upon their request.

Yet another object of the invention is to provide an Internet site which makes individual reference letters available to an inquiring employer or recruiter upon payment of a fee.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4B is a Website screen illustrating the Jobseeker Login procedure according to the present invention.

FIG. 4C is a Website screen illustrating the Jobseeker Registration procedure according to the present invention.

FIG. 4D is a Website screen illustrating the Jobseeker main menu according to the present invention.

FIG. 4E is a Website screen illustrating the Jobseeker's References registration procedure according to the present invention.

FIG. 4G is a Website screen illustrating an e-mail message sent to the Reference Source according to the present invention.

FIG. 4H is a Website screen which comprises the Jobseeker Thank-You screen according to the present invention.

FIG. 4I is a Website screen available from the Jobseeker main menu of FIG. 4F providing additional functionality available to the Jobseeker according to the present invention.

FIG. 4J is a Website screen available from the Jobseeker main menu of FIG. 4F for the Jobseeker to update his/her demographic information according to the present invention.

FIG. 4L is a Website screen illustrating the Reference Source Info Questions (for professional option) asked according to the present invention.

FIG. 4M is a Website screen illustrating the Reference Source Info Questions (for personal option) asked according to the present invention.

FIG. 4N is a Website screen illustrating the Reference Source Info Questions (for letter of reference option) asked according to the present invention.

FIG. 4O is a Website screen illustrating the Reference Source Thank-You screen of the present invention.

FIG. 4P is a Website screen illustrating the I Recruiter/Employer Login procedure according to the present invention.

FIG. 4T is a Website screen illustrating the Recruiter/Employer Reference Source Lookup procedure with a box check marked according to the present invention.

FIG. 4U is a Website screen illustrating the Recruiter/Employer Thank-You screen according to the present invention.

FIG. 4W is a Website screen illustrating the Recruiter/Employer demographic information update procedure according to the present invention.

Similar reference characters denote corresponding features consistently throughout the attached drawings.

DETAILED DESCRIPTION OF THE PREFERRED EMBODIMENT

Figure 1A:
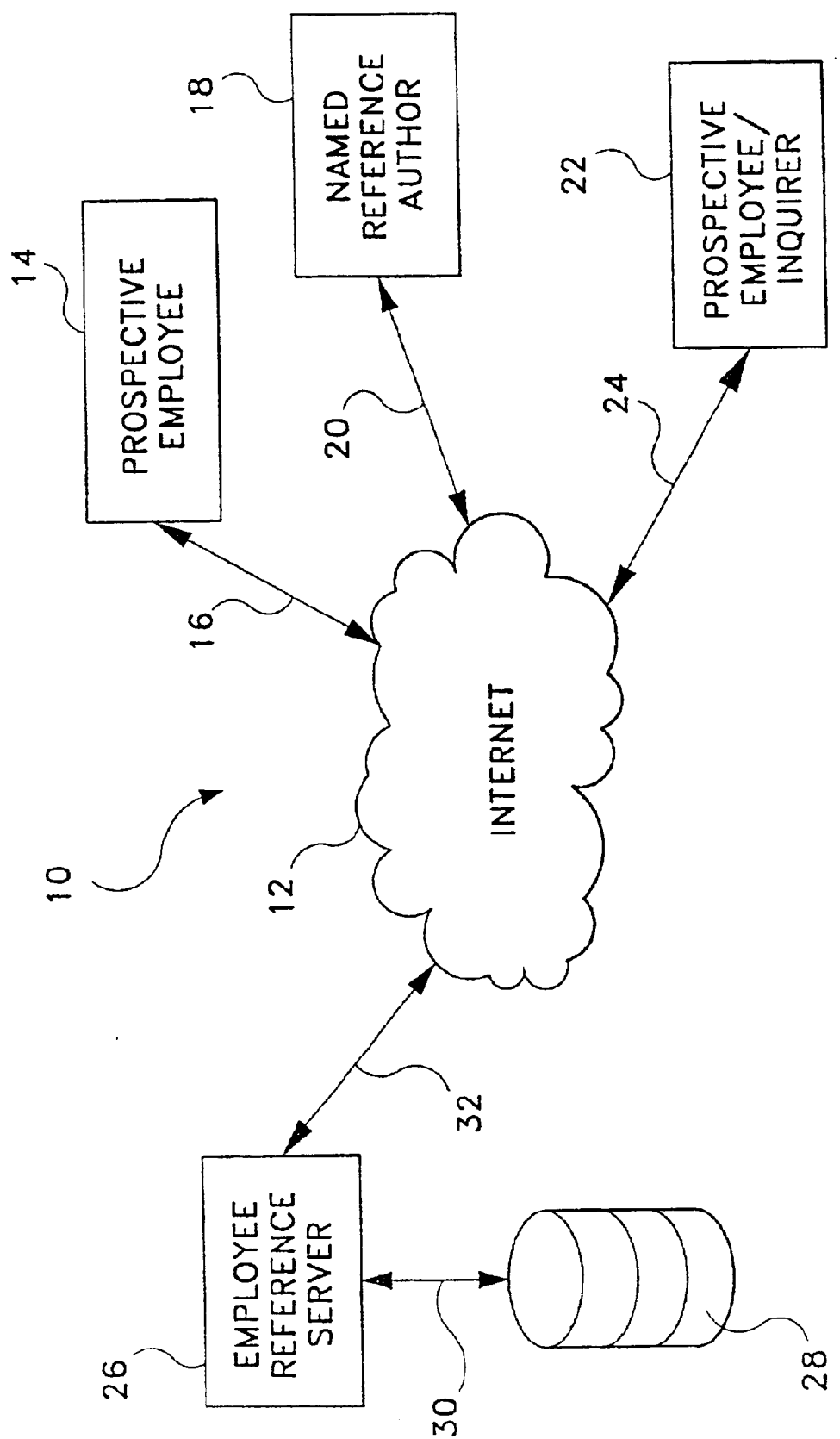
FIG. 1A is a diagrammatical representation of a repository for jobseekers' references on the Internet according to the present invention.

The present invention is an electronic repository for jobseekers' references. The jobseeker registers himself and his reference sources on an Internet site. The references are notified via e-mail, they subsequently log in and enter their personal or professional reference or letter of reference for the jobseeker. The jobseeker gives prospective Recruiters/Employers information on accessing his references. The list of references is available at no charge, but the detailed documents corresponding to the references can be purchased by the Recruiter/Employer. All required security is implemented. The advantages of this process include: (1) elimination of repeated contact of jobseekers' references for positions that change frequently; (2) virtually instant checking of references, eliminating loss of potential employee through extended process; and (3) significant reduction in cost and time of checking reference by recruiter/employee.

Business System Description

Referring to FIGS. 1A through 1D, there is illustrated a diagrammatical representation of a repository for jobseekers' references on the Internet according to the present invention. Internet Website 10 includes Internet 12 in two-way communication with the prospective employee computer 14 by first two-way communication means 16, the named reference author computer 18 by second two-way communication means 20, and the computer of prospective employee/inquirer, i.e. Recruiter/Employer 22 by third two-way communication means 24. An employee reference server 26 is in two-way communication with data repository 28 by fourth two-way communication means 30 and the Internet 12 by fifth two-way communications means 32. The database computer program may be stored in an appropriate element as listed above and makes up no part of the invention.

Figure 1B:
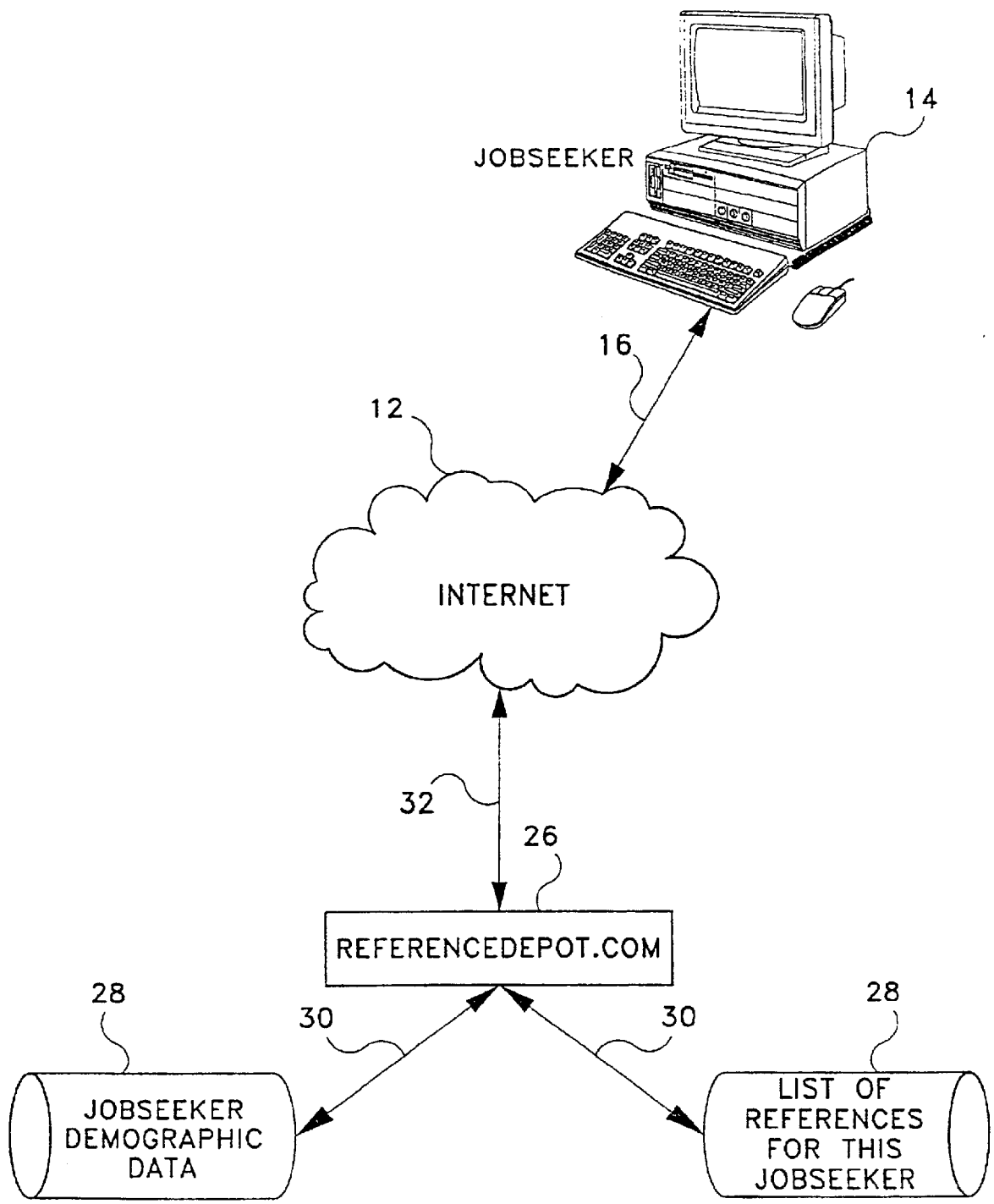
FIG. 1B is a diagrammatical representation according to FIG. 1A illustrating the jobseeker's physical interaction with the Website according to the present invention.

Referring more particularly to FIG. 1B, jobseeker computer 14 is in communication with Internet 12 by first two-way communication means 16 which Internet 12 is in communication with server 26 by fifth two-way communication means 32 and whereby he or she registers with demographic data, and creates a list of references for storage in data depository 28 by fourth two-way communications means 30.

Figure 1C:
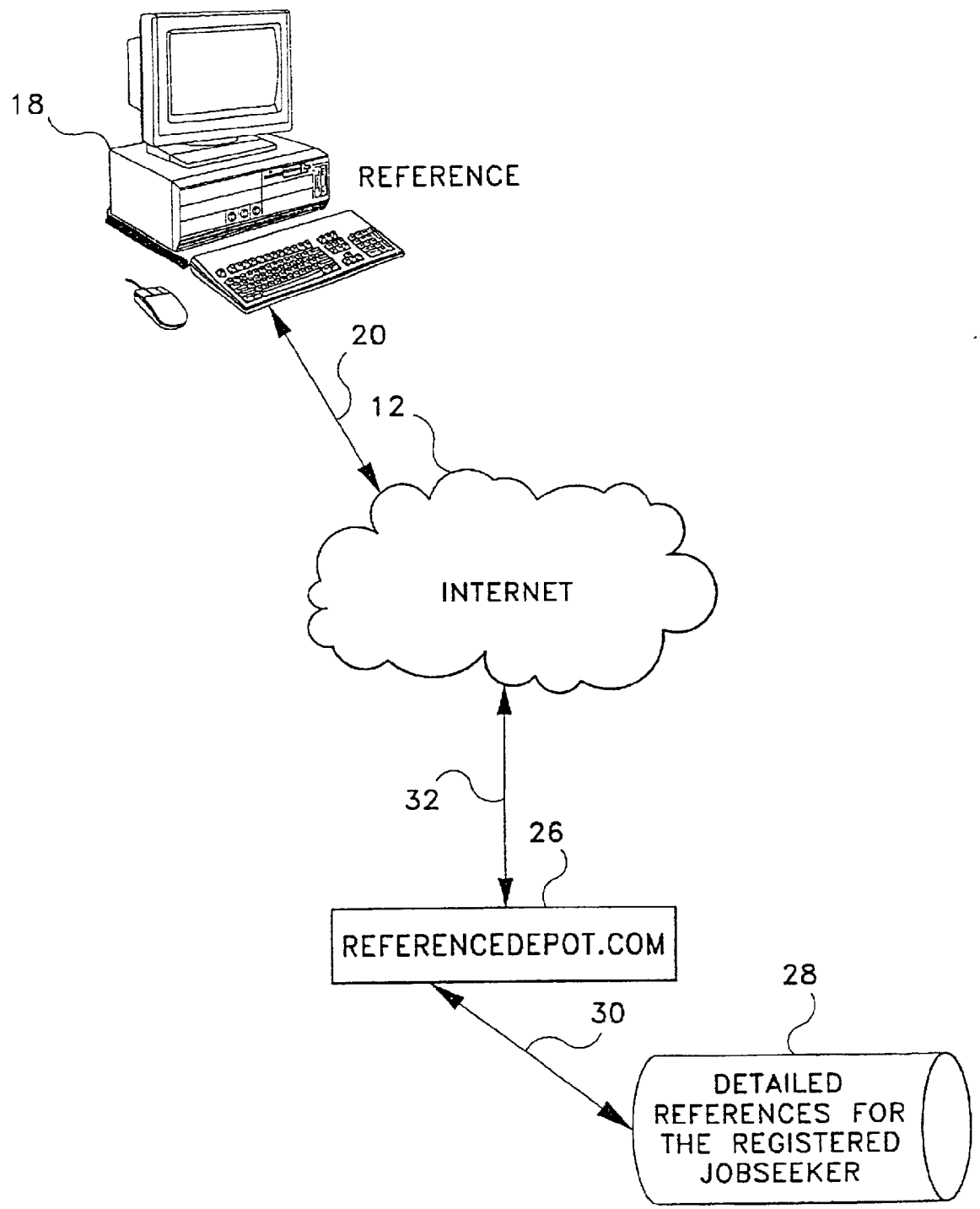
FIG. 1C is a diagrammatical representation according to FIG. 1A illustrating the Reference Source's interaction with the Website according to the present invention.

Referring more particularly to FIG. 1C, Reference Source computer 18 is connected with Internet 12 by second two-way communications means 20, which Internet 12 is connected with server 26 by fifth two-way communications means 32, and whereby the Reference Source provides the desired personal, professional, or letter of reference for the jobseeker, for storage or retrieval in data depository 28 by forth two-way communications means 30.

Figure 1D:
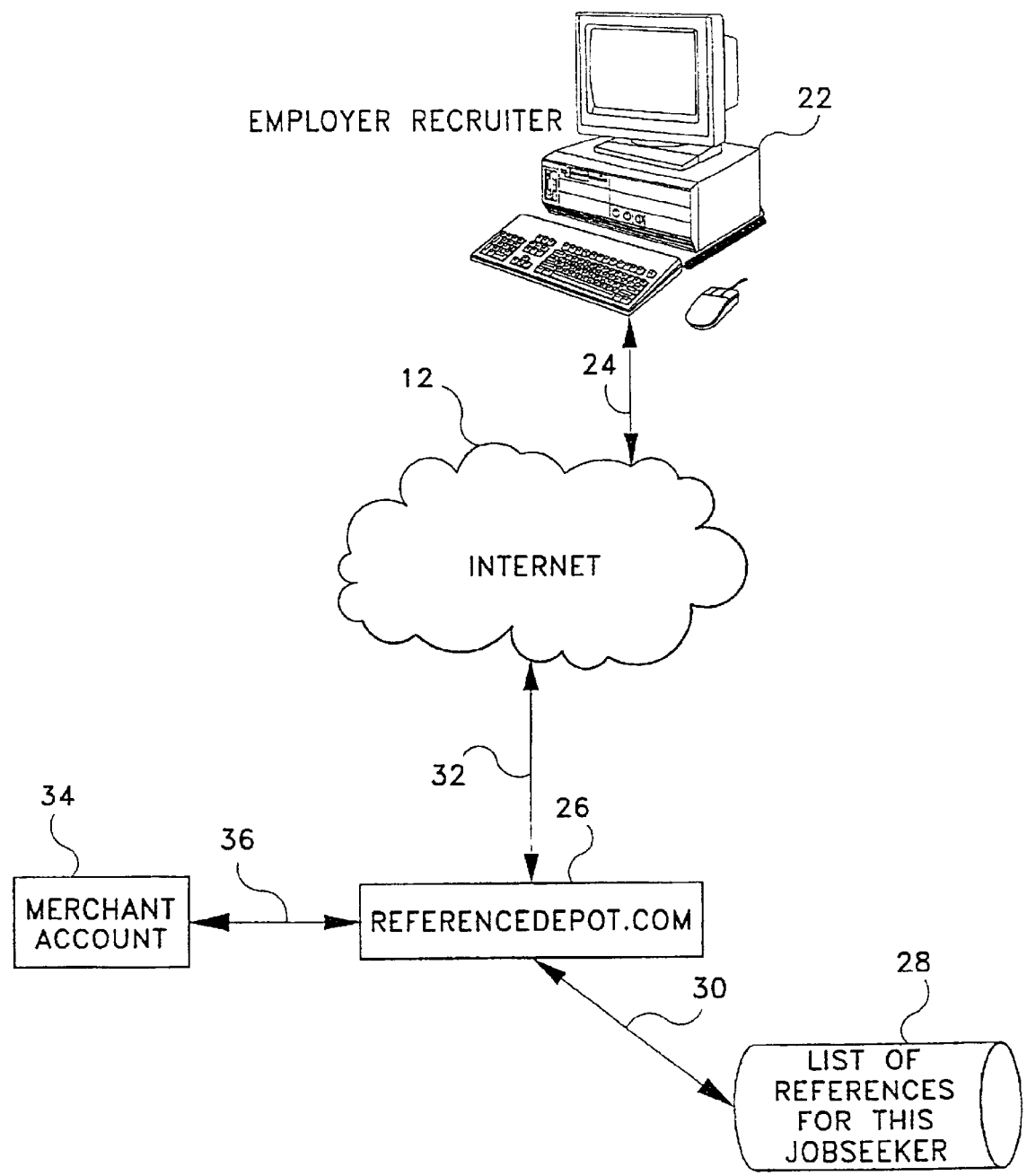
FIG. 1D is a diagrammatical representation according to FIG. 1A illustrating the Recruiter/Employer's interaction with the Website according to the present invention.

Referring more particularly to FIG. 1D, Recruiter/Employer computer 22 is connected with Internet 12 by third two-way communication means 24, which Internet 12 is connected with server 26 by of fifth two-way communications means 32, and whereby the Recruiter/Employer registers and searches for jobseekers' references residing in data bank 28 in communication with server 26 by two-way communications means 30. The Recruiter/Employer similarly has access to merchant account 34 through server 26 by sixth two-way communications means 36 for purchase of the detailed reference documents, which are then sent to him via e-mail.

Business Method Description

Figure 2:
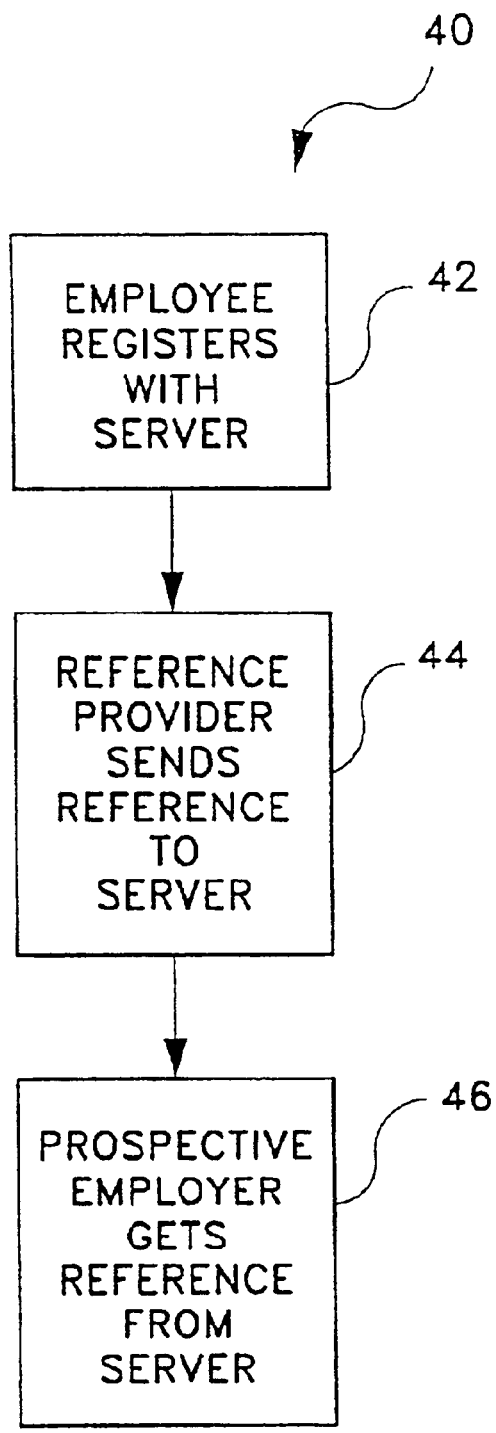
FIG. 2 is a flow chart of steps taken in the implementation of the method of FIG. 1.

Referring to FIG. 2, there is broadly shown a flow chart of steps taken with the participation of the Website server of the present invention in the implementation of the method of FIG. 1. Reference providing method 40 includes prospective employee registration step 42, reference provider correspondence step 44, and prospective employer reference receipt step 46.

Figure 3A:
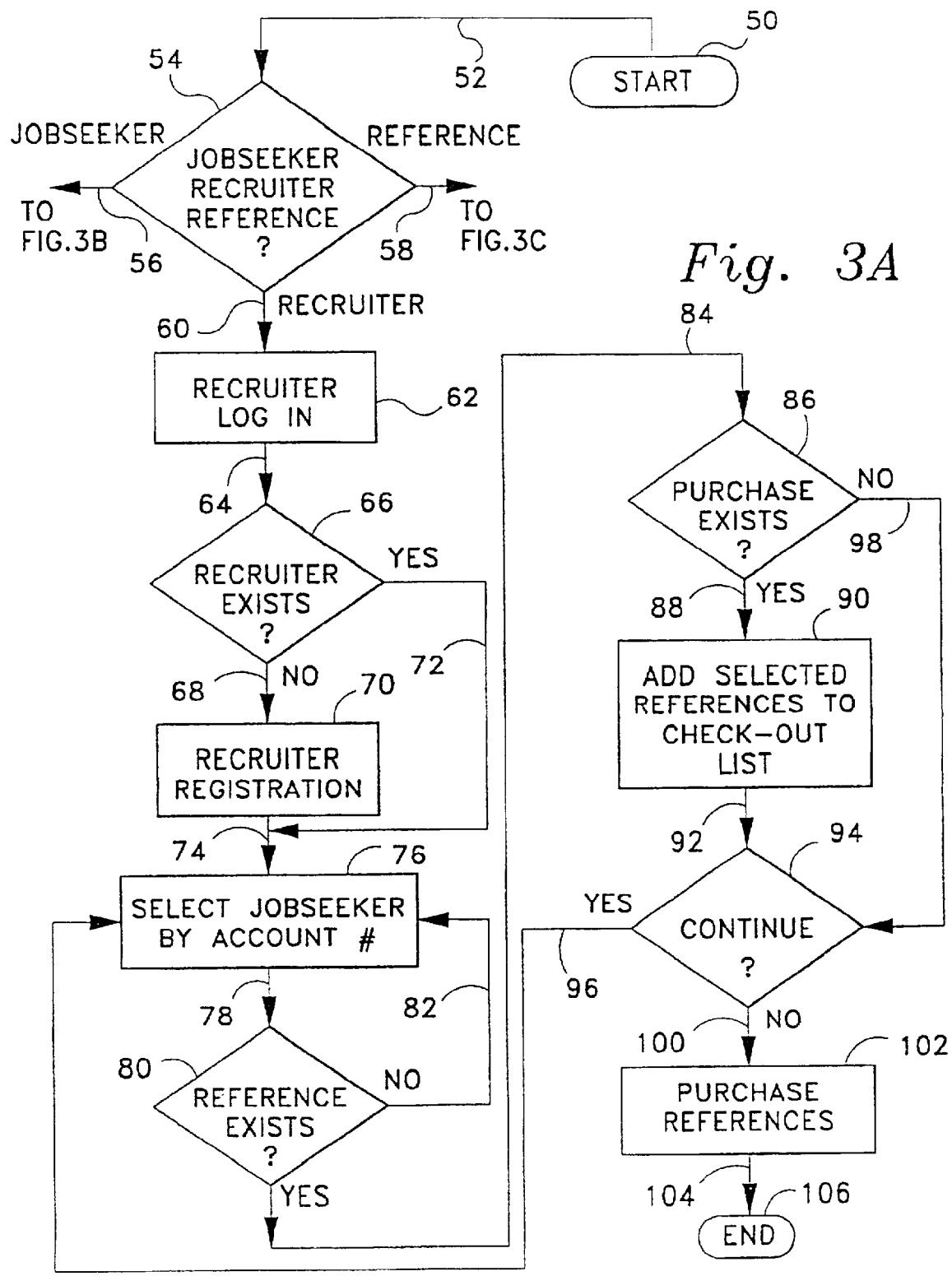
FIG. 3A is a flowchart further illustrating the prospective Recruiter/Employer interface process of the invention of FIG. 2.

Referring to FIG. 3A, there is shown a flow chart of specific steps taken in implementing the method 40 of FIG. 2, and, more specifically the prospective employer reference receipt step 46. Reference providing method 40 is carried out beginning with Start action 50 located on the inventive Website home page. The user of Start action 50 is lead by path 52 to decision step 54 whereby the user determines if he or she is a jobseeker, an recruiter/employer, or a reference source. If the user is a jobseeker, he follows path 56 to the jobseekers' steps illustrated in FIG. 3B, below. If the user is a reference source, he or she follows path 58 to the Reference Source steps illustrated in FIG. 3C, below. If the user is an recruiter/employer, he or she follows path 60 to Recruiter Login step 62. After completing the Login step 62, the user follows path 64 to decision step 66 where it is determined if the user exists in the database. If the user is not listed, he or she follows path 68 to recruiter registration step 70, wherein the recruiter provides necessary identification data to the data bank and proceeds along path 74 where the user selects the jobseeker by account number in step 76. If the user data already exists in the data bank, he or she moves from decision step 66 along path 72 to merge with path 74 and selects the jobseeker by account number in step 76 as above. The user then follows path 78 to decision 80 where it is determined if any references under that account number exist. If the user finds that no reference exists under that account number, he or she follows path 82 to step 76 where another account number is selected. If the user finds that at least one reference exists under the entered account number, he or she follows path 84 to decision 86 where a decision is made to purchase one or more references listed. If the user decides to purchase a particular reference document, he or she follows path 88 to checkout list step 90 where the selected reference or references are added to a checkout list. The user then follows path 92 to decision 94 where the user decides whether or not to continue reviewing references. If the user decides to continue reviewing references, he or she follows path 96 back to step 76 where another jobseeker account number is selected. If a purchase is not made in decision 86, the user follows path 98 to decision 94 where he or she decides whether or not to continue reviewing references and, if so, follows path 96 as above. If the decision 94 to continue is negative, he or she follows path 100 to the reference purchase step 102, where payment is made by any convenient means as is known in the art as embodied, for instance, in a merchant account 34 in two-way communication with server 26. Once the purchase step 102 is made, the user follows path 104 to obtain the reference documents purchased, and then takes end action step 106 which provides a Thank-You Website screen where he or she is given instructions to exit the inventive Website.

Figure 3B:
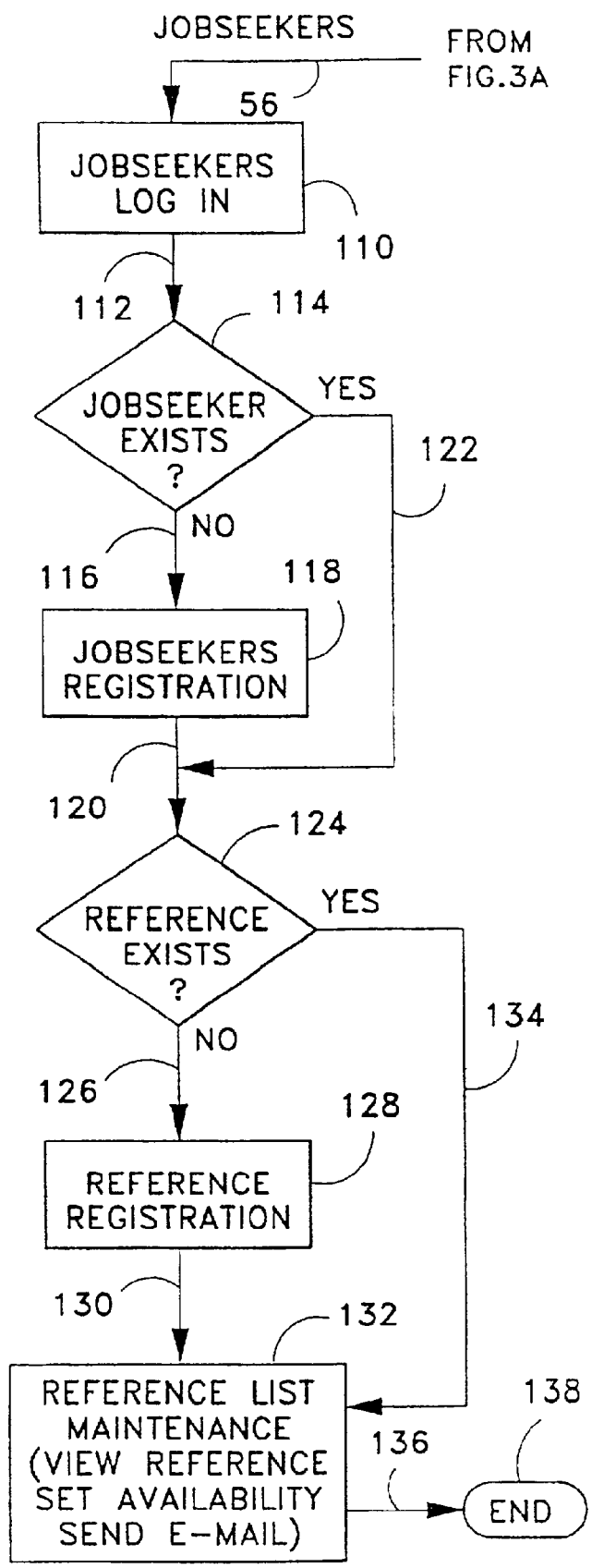
FIG. 3B is a flowchart further illustrating the prospective employee or jobseeker reference registration interface process of the invention of FIG. 2.

Referring to FIG. 3B, there is shown a flow chart of specific steps taken in implementing the method 40 of FIG. 2, and, more specifically, the Prospective Employee Registers with Server step 42. The jobseeker follows path 56 from decision 54 of FIG. 3A, above, to the Jobseekers Login step 110. Upon Login, the jobseeker follows path 112 to the decision 114 as to whether the user has existing identification data in the system data bank. If the user has insufficient existing data, he or she follows path 116 to the Jobseekers Registration step 118 where registration is completed and the user follows path 120. If the decision 114 is that the jobseeker is properly registered, he or she follows path 122 to join path 120 to decision 124 where it is decided if the desired references exist in the system data bank. If not, the user follows path 126 to Reference Registration step 128, and, upon accomplishing registration of all references that he or she desire to register, follows path 130 to the reference list maintenance step 132. If the decision 124 is that desired references already exist, the user follows path 134 to the reference list maintenance step as above. At this step, the jobseeker can view references existing in the database, determine their availability to prospective Recruiter/Employers, and send e-mails to all prospective Recruiter/Employers. Once satisfied, the jobseeker follows path 136 to End action step 138 which activates a Thank-You Website screen where instructions are provided to exit from the Website.

Figure 3C:
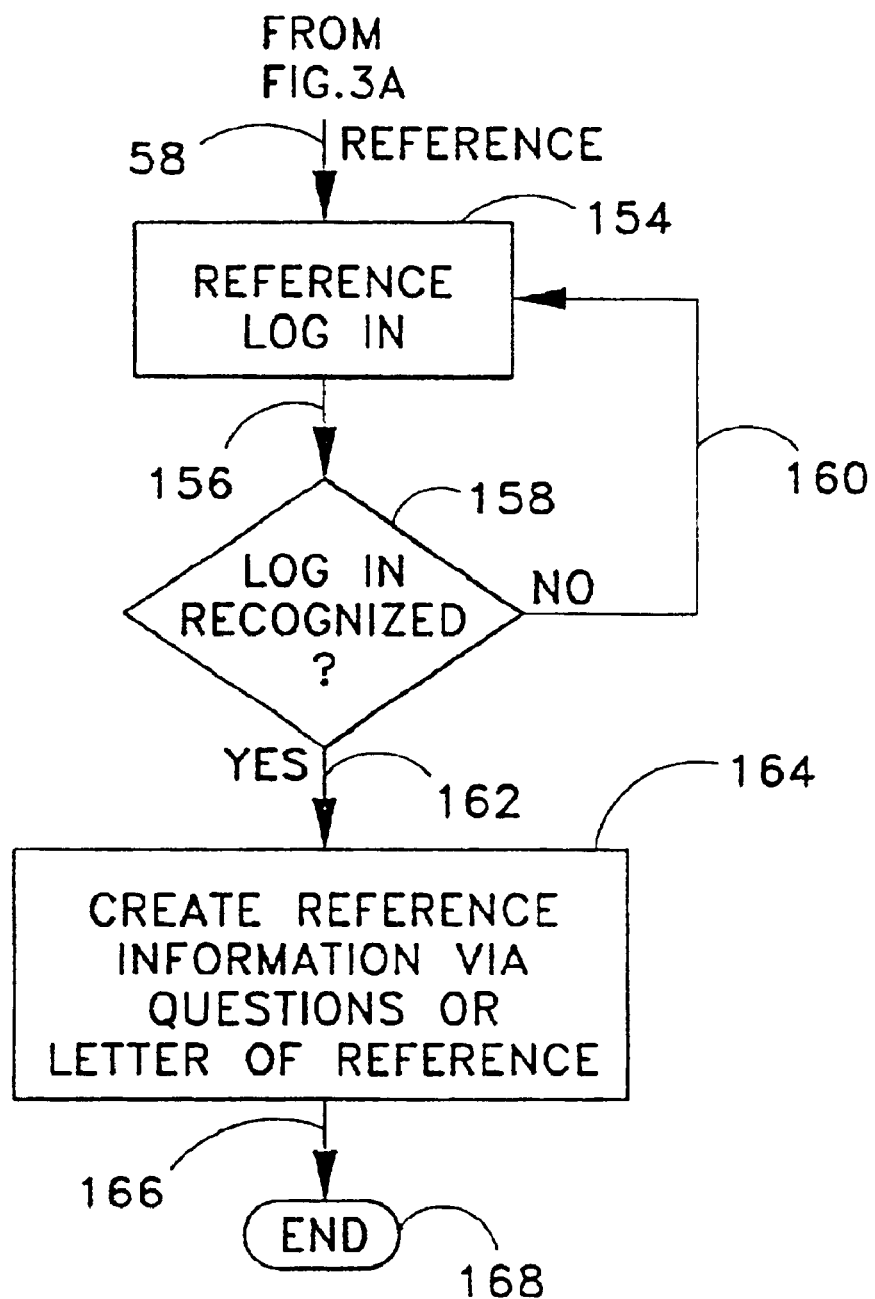
FIG. 3C is a flowchart illustrating the Reference Provider interface process of the invention of FIG. 2.

Referring to FIG. 3C, there is shown a flow chart of specific steps taken in implementing the method 40 of FIG. 2, and, more specifically, the Reference Provider reference document sending step 44. A Reference Source follows path 58 from decision 54 (see FIG. 3A) to Reference Login step 154. The user then follows path 156 to decision 158 where it is decided whether the user Login is recognized as determined through interaction with the system data base. If the user Login is not recognized, he or she follows path 160 to return to Reference Login step 154 to attempt to re-Login, or Login in response to another jobseeker's e-mail. Once the user successfully logs in, he or she follows path 162 to step 164 where the reference is created through a series of queries or other appropriate methodology and entered into the system database. Upon completion of reference creation step 164, the user follows path 166 to End action step 168 which activates a Thank-You Website screen where instructions are given for exiting the inventive Website.

A Frequently Asked Questions (FAQ) Website page and a Contact Us Website page may be reached directly from the home page of the inventive Website. The FAQ page provides answers to frequently asked question about the inventive Website. The Contact Us page provides a means for the user to provide feedback to the inventive Website operators.

Figure 4A:
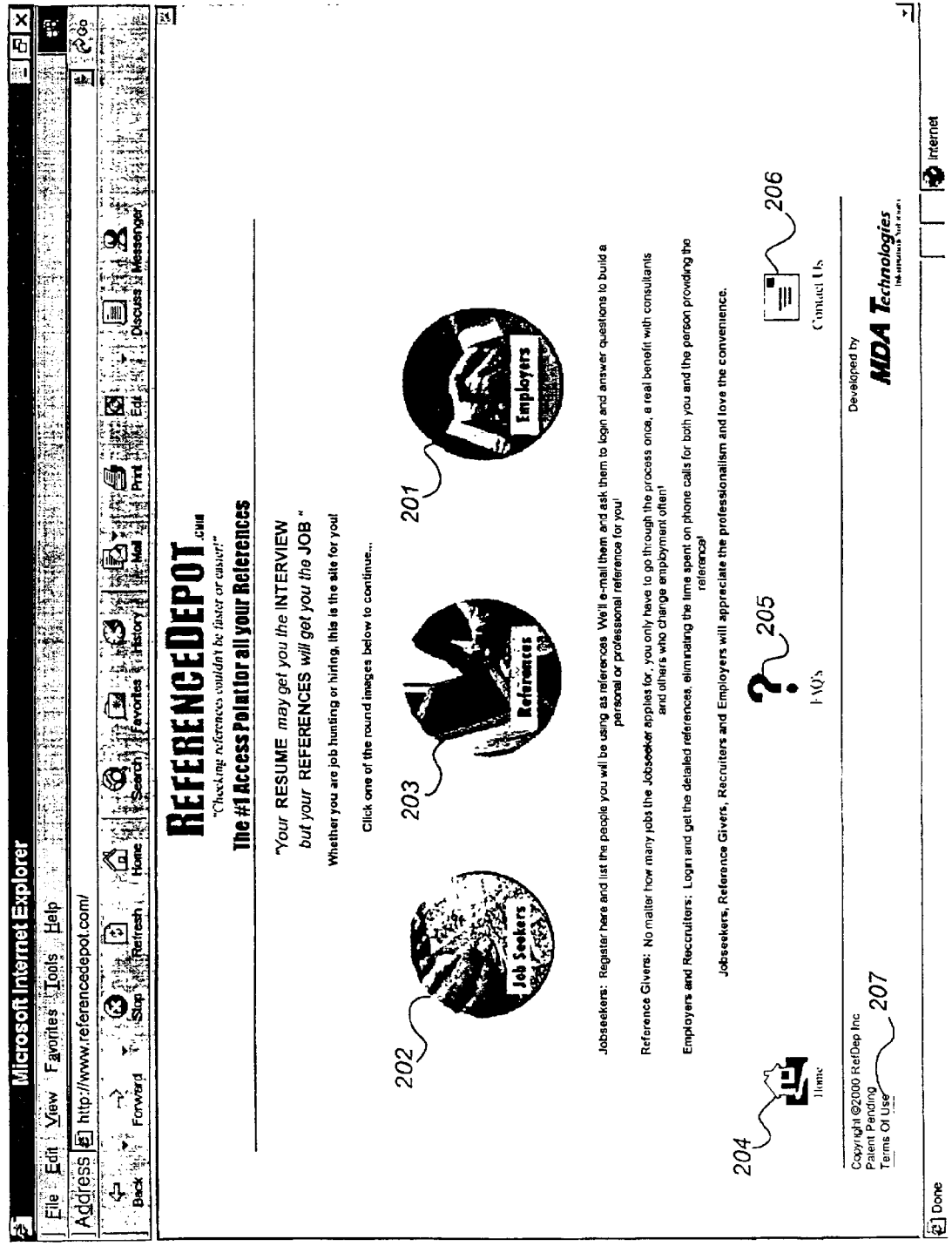
FIG. 4A is a Website screen illustrating the Home Page according to the present invention.
Figure 4B:
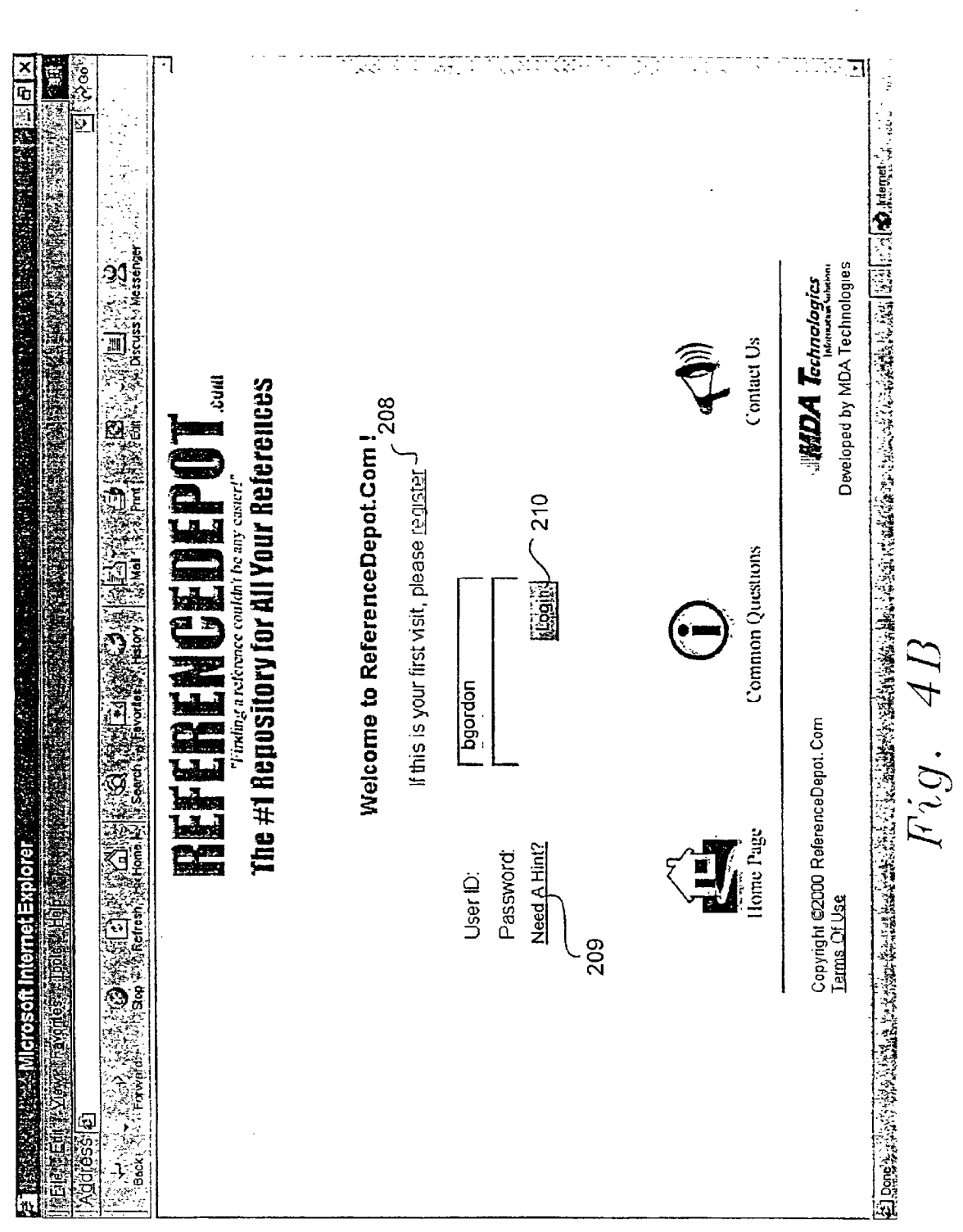
Figure 4C:
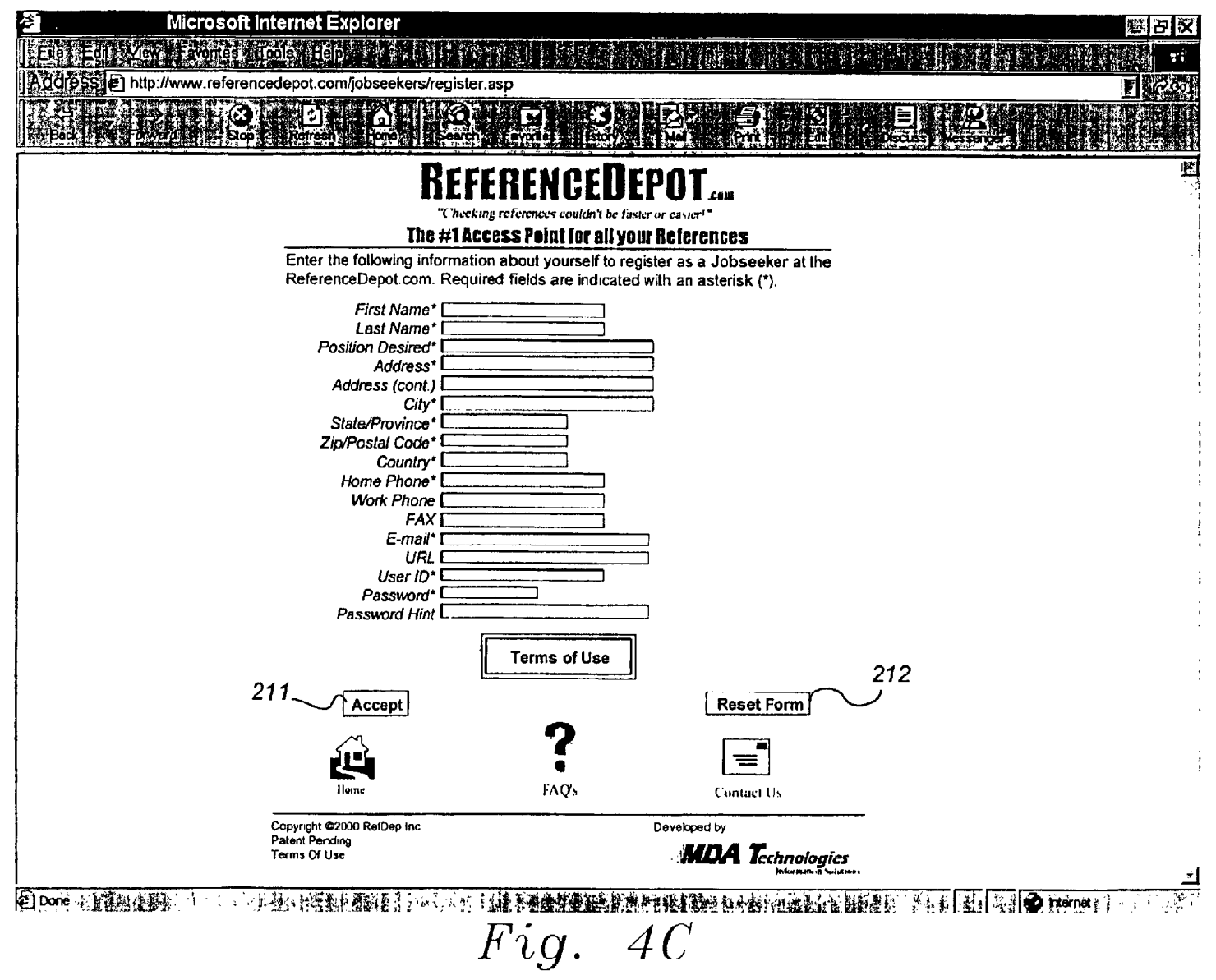
Figure 4D:
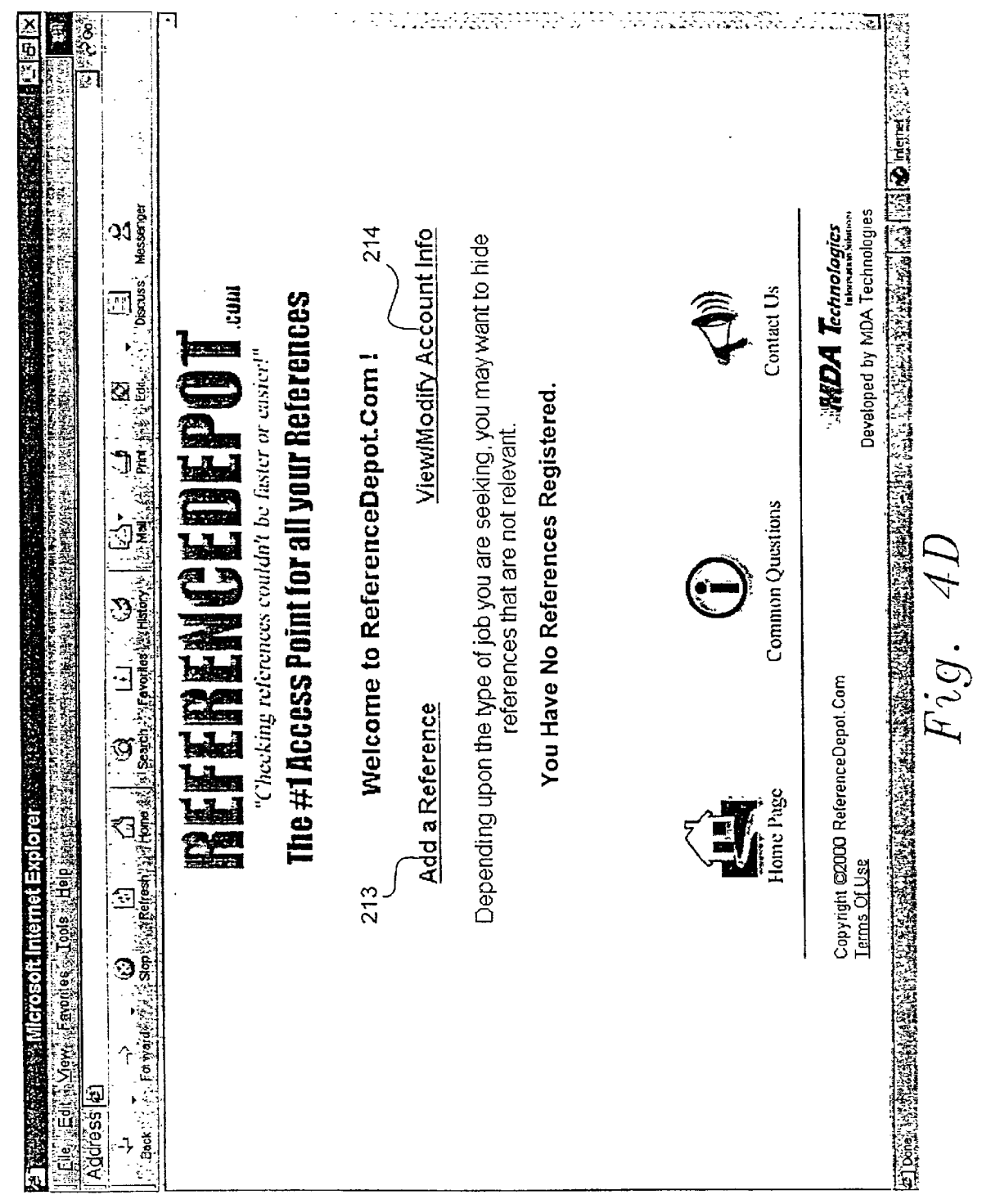
Figure 4E:
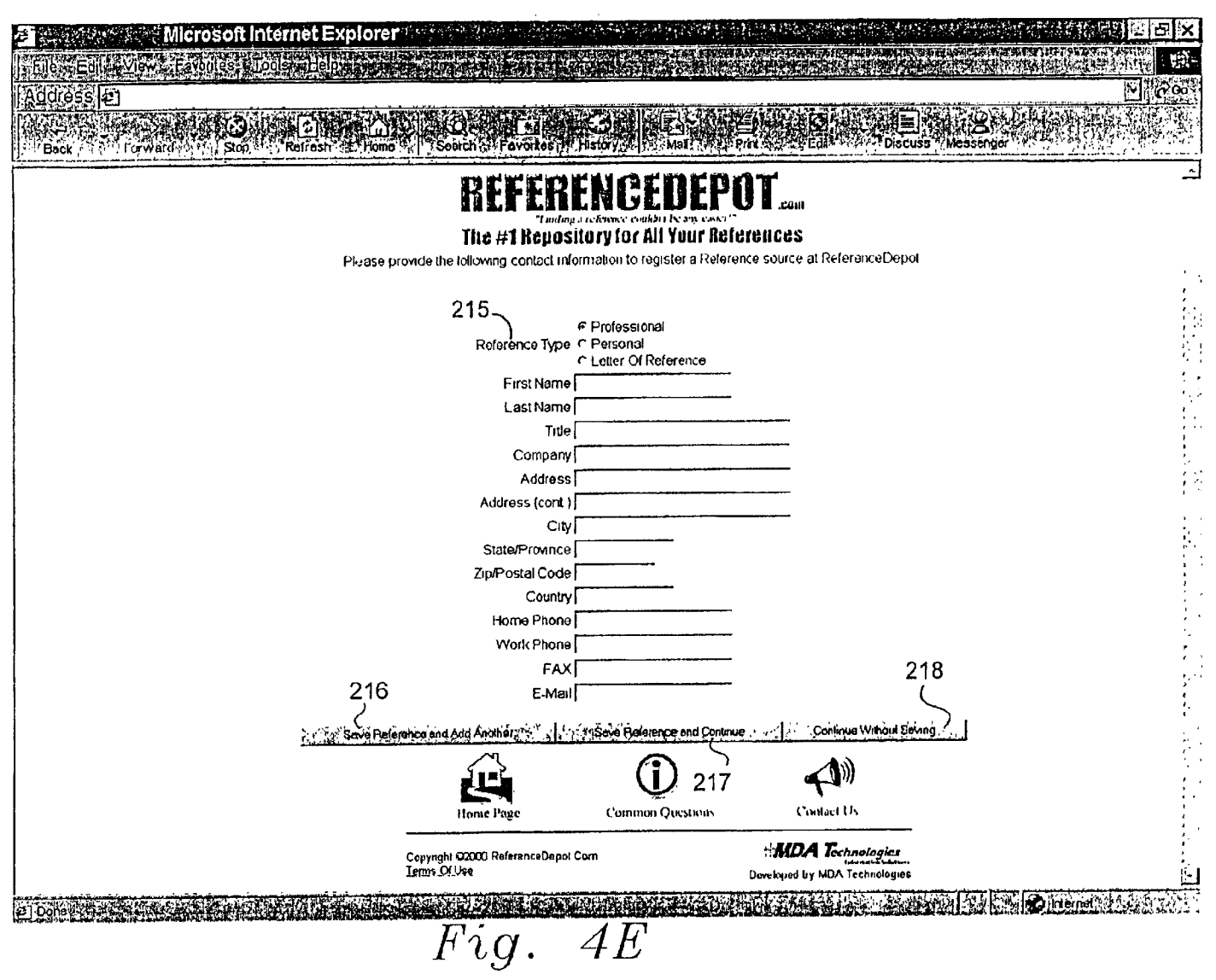

Website Description
Website Buttons, Functions and Hyperlinks
Referring to FIGS. 4A through 4W:

201. The Employers button from the home page takes the user to the Recruiter/Employer login screen. The purpose of this button is to allow Recruiter/Employers to begin the Login or registration process so they can access the jobseeker's reference information. The Employer Login screen is displayed when this button is pressed.

202. The Jobseekers button from the home page takes the user to the Jobseekers Login screen. The purpose of this button is to allow the jobseeker to begin the login or registration process. The jobseeker login screen is displayed when this button is pressed.

203. The References button from the home page takes the user to the Reference Login screen. The purpose of this button is to allow the Reference Sources the access point to begin entry of the reference for the jobseeker. The Reference Login screen is displayed when this button is pressed.

204. The Home Page button allows the user to go back to the Website's home page from anywhere within the Website.

205. The FAQ's button takes the user to a screen listing many frequently asked questions about the Website and its purpose.

206. The Contact Us button takes the user to a screen, which allows them to contact the inventive Website operators regarding questions, concerns, etc.

207. The Terms of Use link takes the user to the terms of use for the Website.

208. The register link from the Jobseeker Login screen takes the user to the jobseeker registration page. The purpose of this link is to allow the jobseeker the access point to begin registering his or her demographic information for the Website service. The jobseeker registration screen is displayed and the user (jobseeker) is to complete all required fields for demographic, identification and password information.

209. Need A Hint link from the Jobseeker Login screen takes a registered Jobseeker to a hint for his or her password. The purpose of this link is to allow the user the ability to look at the hint he or she has chosen during the registration process so that they will remember their password.

210. The Login button from the jobseeker login screen takes the user to the jobseeker main menu screen. The purpose of this button is to allow a registered jobseeker to re-enter the Website and go to a main menu screen containing his or her reference list and demographic information. The jobseeker main menu is displayed when this button is pressed.

211. The Accept button from the Jobseeker registration screen takes the user to the jobseeker main menu screen. The purpose of this button is to save the jobseeker's demographic, identification and password information and allows the jobseeker to continue on to the main menu screen.

212. The Reset Form button from the jobseeker registration screen clears the entered information and displays an empty jobseeker registration screen to the user.

213. The Add a Reference link from the Jobseeker main menu screen takes the user to a Jobseekers References screen. The purpose of this link is to allow the jobseeker to begin the registration of his or her reference. The Jobseeker References screen is displayed and the user (jobseeker) is to complete all required fields.

214. The View/Modify Account Info link from the Jobseeker main menu takes the user to the Jobseeker demographic screen. The purpose of this link is to allow the user to view and update his or her demographic information. The Jobseeker registration screen is displayed and the user should update the appropriate information.

215. The Reference type radio buttons on the Jobseekers References screen allow the user to define what type of reference the Reference Source will be providing The default is set to a professional reference.

216. The Save Reference and Add Another button from the Jobseekers References screen takes the user to another blank Jobseekers References screen. The purpose of this button is to save the registration information provided on the current screen and allow the user to register another Reference Source. The Jobseekers References screen will be displayed when clicking on this button.

217. The Save Reference and Continue button from the Jobseekers References screen takes the user to the Jobseeker main menu. The purpose of the button is to save the registration information provided on the current screen and return the user to the Jobseeker main menu to view the listing of all registered references. The Jobseeker main menu will be displayed when clicking on this button. The contents of the main menu screen will display at least one registered reference.

218. The Continue Without Saving button from the Jobseekers References screen takes the user to the Jobseeker main menu The purpose of this button is to abort the reference registration process and return the user to the Jobseeker main menu screen. The Jobseeker main menu screen will be displayed when clicking on this button. The contents of the main menu screen may or may not contain registered references.

219. The update button from the Jobseeker account information screen takes the user to the Jobseeker main menu. The purpose of this button is to save the updates provided by the user and to return the user to the Jobseeker main menu.

220. The Available/Hidden radio buttons from the Jobseeker main menu allow the user to either hide or make available the reference provided by the corresponding Reference Source. If a particular reference is hidden, it will not be displayed in the list of references when the list is displayed to the Recruiter/Employer. If a reference is not hidden, it is available and will be displayed in the list of references when the list is displayed to the Recruiter/Employer. All references in the list are displayed to the user whether they are hidden or available, so that the jobseeker can set this property.

221. The Notify Reference link from the Jobseeker main menu sends an e-mail to the Reference Source from the Website. The purpose of the e-mail is to inform the Reference Source that the jobseeker has requested that they provide a reference and use the Website as the repository. The e-mail will contain a unique identification and password to be used by the Reference Source to Login to the Website and enter his or her reference for the jobseeker.

222. The "References Available" comments can optionally be moved to another screen with a "logout" button in its place. The Accept and Continue button from the Jobseeker main menu will take the user to a Thank-You screen. This screen has information regarding next steps and his or her account number, which should be provided to Recruiter/Employers.

223. After a reference has been provided, the Notify Reference link will change to Reference Completed indicating that the reference has been given and saved to the database.

224. Pressing the Reference Source edit link (i.e., for Jane Doe) on the Jobseeker main menu displays the Jobseeker References information screen. The purpose of this link is to provide the Jobseeker the ability to update the Reference Source's demographic information after the registration process.

225. Pressing the Login button on the Reference Login Screen displays the reference information questions on the next screen. The purpose of this button is to allow the Reference Source into the screen containing reference information questions for a personal, professional or Letter of Reference. I 226. Pressing the Submit button on the Reference Information Questions screen displays the Reference Thank-You screen. The purpose of this button is to save the reference information provided by the Reference Source and take the user to the exit Thank-You screen. The reference information is saved with a date-time stamp and cannot be edited after being written to the database.

227. Pressing the Reset button on the Reference Information Question screen clears the entered information and displays an empty Reference Information Questions screen.

228. Pressing the Register link on the Employer Login screen displays the Employer Registration screen. The purpose of this link is to allow the Recruiter/Employer to register for the Website service provided on the inventive Website. The Recruiter or Employer should enter the required information on the Employer Registration screen.

229. Pressing the Need A Hint link on the Employer login screen displays the Recruiter/Employer's password hint. The purpose of this link is to allow the user the ability to look at the hint he or she chose during the registration process so that they will remember their password.

230. Pressing the Login button on the Employer Login screen displays the Recruiter/Employer main menu screen. The purpose of this button is to allow a registered Recruiter/Employer to re-enter the Website and go to the main menu screen to access their account information and lookup a jobseeker's references.

231. Pressing the Register button on the Employer Registration screen displays the Recruiter/Employer main menu screen. The purpose of this button is to save the Employer's demographic, identification, and password information and allow the Employer to continue to the main menu screen.

232. Pressing the Reset form button on the Employer Registration screen clears the entered information and displays an empty Employer registration screen.

233. Pressing the View/Modify Account Info link on the Recruiter/Employer main menu screen displays the Recruiter Acct Info screen. The purpose of this link is to allow the user to view and update his or her demographic information. The user should update the appropriate information.

234. Pressing the Lookup button on the Recruiter/Employer main menu displays the Recruiter Lookup screen for that jobseeker. The purpose of the button is to allow the Recruiter or Employer to view the list of Reference Sources for the jobseeker. The Recruiter or Employer will be given the opportunity to purchase the reference details from the Recruiter Lookup screen.

235. Pressing the update button on the Recruiter Acct Info screen saves the updates provided by the user and returns the user to the Jobseeker main menu.

236. Pressing the Purchase Checked References button on the Recruiter Lookup screen allows the Recruiter/Employer to purchase the reference details for the selected (checked) Reference Source.

237. Pressing the Back to Recruiter/Employer Menu link returns the user to the Recruiter/Employer main menu screen. The purpose of this link is to allow the user the ability to select a different jobseeker or exit the Website.

238. Pressing the View/Check Out button on the Recruiter/Employer main menu begins the purchasing process. The recruiter/Employer is then taken through a "checkout" process to purchase their reference detailed documents (the details of this process are not described, herein, but are well-known expedients in the art, and see FIG. 1C above). The final screen displayed after the purchase is the Recruiter/Employer Thank-You screen.

Website Operation and Function

In operation, there are three categories of users for the Website: the Jobseeker, the Reference Sources of the Jobseeker, and the Recruiter/Employer, who is seeking the references for the Jobseeker. These users access the Internet Website of the present invention via the Worldwide Web. The entry of the Website address displays the Website home page illustrated in FIG. 4A. There are three flow processes that begin from this home page, each corresponding to the category of user above:

(A) The jobseeker will be taken through a process of registration for his or her demographic information, registration of his or her reference source, and ability to update/maintain his or her account information.

(B) The reference source will be taken through a Login process that will then display a series of questions for the personal/professional reference or a space to enter a letter of reference.

(C) The recruiter/employer will be led through a process of registration for his or her demographic information, lookup of the jobseeker's reference, and purchase of reference detail for the jobseeker's reference.

Jobseekers

The first step for the jobseeker is to access the home page of the invention (FIG. 4A). The jobseeker then clicks the Jobseekers button 202 to begin the login or registration process. Button 202 on the home page takes the user to the Jobseeker Login screen (FIG. 4B), which will allows the user to either register or Login to his or her account. If this is the first time that the jobseeker has entered this Website, he or she will need to click the Register link 208. Clicking on this link will take the jobseeker to the Jobseeker Registration screen (FIG. 4C). The jobseeker must complete the required fields which are marked with an asterisk (*) before the registration process is complete. The jobseeker is able to use the tab key or mouse to move between the fields. When the jobseeker has completed all the required fields and has read and accepted the Terms of Use, the jobseeker then clicks the Accept button 211 on the Jobseeker Registration screen (FIG. 4C). If the user needs to re-enter or start over before clicking the register button, the Reset Form button 212 can be clicked to clear the form.

Once the jobseeker has clicked the Accept button 211, he or she will be taken to the Jobseeker main menu, which is illustrated in FIG. 4D. This screen allows the user to view his/her registered Reference Sources and access his/her account information. The newly registered jobseeker will see a message reading, "You have no references registered" on Jobseeker Main Menu (FIG. 4D). This message indicates to the jobseeker that he or she should begin the Reference Source registration process by clicking on the Add a Reference link 213. Clicking on button 213 takes the user to the Jobseekers References screen, FIG. 4E. The jobseeker must click the type of reference that this Reference Source will be providing: Professional, Personal, or Letter of Reference. The jobseeker then enters the required demographic information for this Reference Source using either the tab key or the mouse to move between fields. When the jobseeker has completed all the required information to register his or her Reference Source, he or she must then select one of the following buttons to continue:

(A) The Save References and Add Another button 216 is used if the jobseeker wishes to register another Reference Source. Clicking on this button will save the entered information into the database and display another blank Jobseekers References screen (FIG. 4E).

(B) The Save Reference and Continue button 217 is used if the jobseeker wishes to only register this Reference Source and return to the Jobseeker main menu. Clicking on this button will save the entered information into the database and return the user to the Jobseeker main menu.

(C) The Continue Without Saving button 218 is used if the jobseeker wishes to abort the registration button and return to the Jobseeker main menu. Clicking on this button WILL NOT save any entered information and will return the user to the Jobseeker main menu.

The inventive Website has been created to be flexible, giving the jobseeker the option to enter all of his or her Reference Sources at one time, or return to the Website at a later time to add other Reference Sources.

When the jobseeker is returned to the Jobseeker main menu (FIG. 4F), he or she will notice that at least one registered Reference Source is displayed. The Reference Source's name, title, address, telephone numbers and e-mail address are displayed for each Reference Source registered. The next step in the process is for the Reference Source to be notified that the jobseeker has requested that he or she enter a reference onto the Website of the present invention. The jobseeker clicks the Notify Reference link 221 next to the corresponding Reference source to begin that notification process. The inventive Website then sends an e-mail message to the Reference Source (FIG. 4G) indicating that the jobseeker has requested a reference from him or her and the instructions as to how to Login to the Website to provide that reference information. The jobseeker will not be shown this e-mail message to ensure that only the Reference Source will receive the unique login information. The jobseeker will be returned to the Jobseeker main menu screen (FIG. 4F) after clicking the link 221.

At the bottom of the Jobseeker main menu, there are additional instructions or recommendations to the jobseeker as to the next steps. The jobseeker will then click the "Accept and Continue" button provided at the bottom of the screen and be taken to a Jobseeker Thank-You screen (FIG. 4H). This Thank-You screen will provide the jobseeker with his or her account number, which is to be provided to prospective recruiters or employers. When the Recruiter/Employer uses this account number in their lookup process, he or she will be able to view the summary and purchase the detailed reference document provided by the Reference Source. It is recommended that the jobseeker place a phrase indicating the references' availability on the inventive Website and the account number onto his resume.

Figure 4F:
FIG. 4F is a Website screen illustrating the Jobseeker main menu according to the present invention with at least one register Reference Source displayed.
Figure 4J:
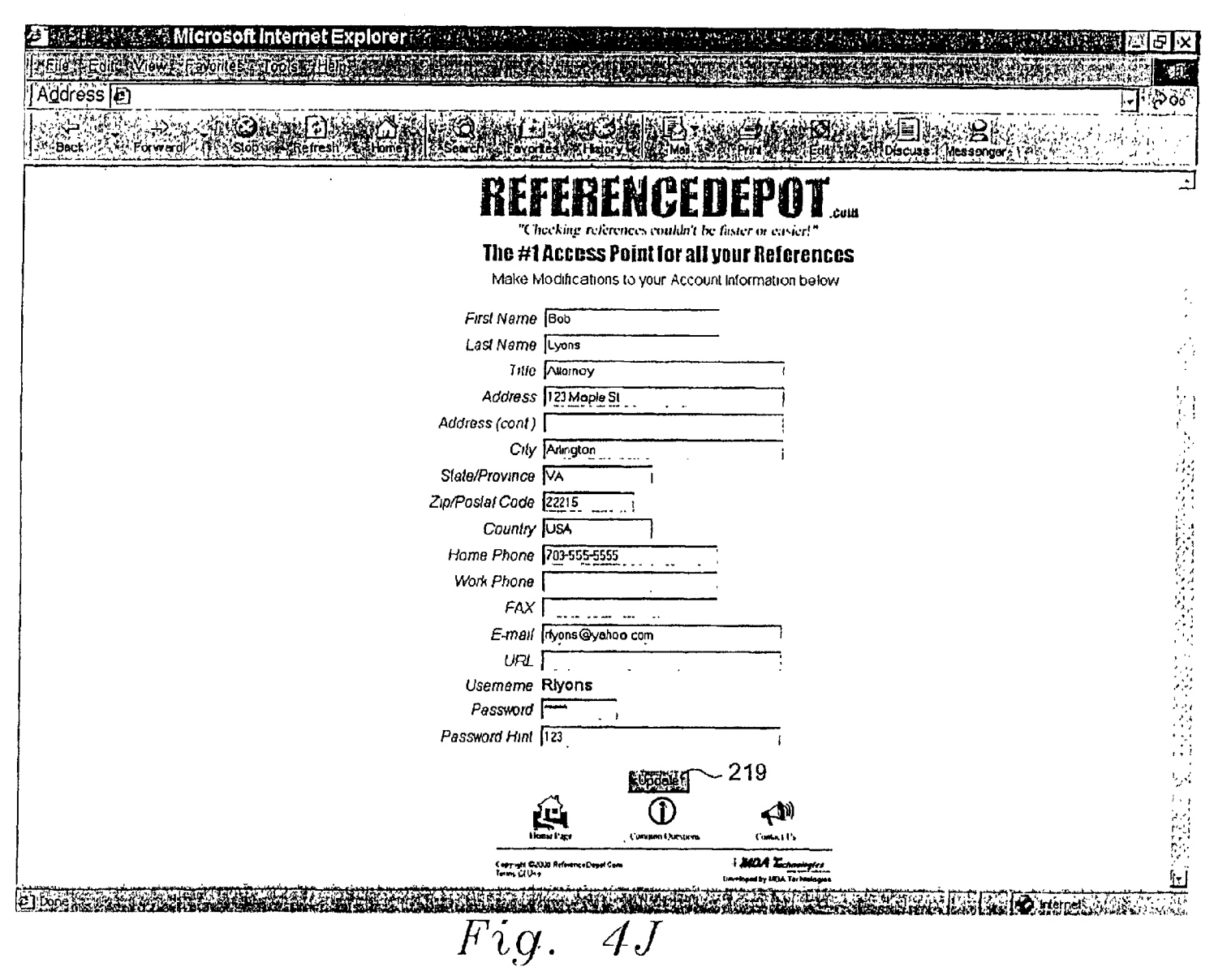

There is additional functionality available to the jobseeker from the Jobseeker main menu (FIG. 4F). Some of these functions, such as View/Modify Account Info 214 or make references Available/Hidden 220, are available upon the initial registration.

When the jobseeker returns to the inventive Website, he or she begins at the home page (FIG. A) and clicks on the Jobseekers button 202. At the Jobseeker Login screen (FIG. 4B), the jobseeker should enter his or her User ID and Password and then click on the Login button 210. If the user has forgotten his or her password, pressing the Need A Hint link 209 will display the password hint provided by the jobseeker during the initial registration process. The jobseeker is taken to a Jobseeker main menu resembling one in FIG. 4I after clicking the login button on FIG. 4B.

The Jobseeker main menu, FIG. 4I, illustrates what the screen would look like after the jobseeker has registered one or more Reference Sources and at least one of those can use the View/Modify Account Info link 214 to update any of his/her demographic information (see FIG. 4J). After the jobseeker updates the fields on the Jobseeker Acct Info screen (FIG. 4J), he or she must click on the Update button 219 to save the information and return to the Jobseeker main menu. The jobseeker can also update the demographic information for the registered Reference Source by clicking on the Reference Source's edit link 224. Once the Reference Source has entered the reference, the jobseeker will see the Reference Completed message 223 displayed in the e-mail column for the Reference Source.

If, at some point in the future, the jobseeker wishes to not utilize one of the references entered by a registered Reference Source, he or she can click on the "hidden" or "available" buttons 220 next to the corresponding Reference Source. This function will allow the jobseeker to view the Reference Source from his or her main menu but will not display this Reference Source to a prospective Recruiter/Employer.

The jobseeker exits the Jobseeker main menu (FIG. 4I) using the "Accept and Continue" button at the bottom of that screen. The Jobseeker Thank-You screen (FIG. 4H) is then displayed, indicating to the jobseeker that he or she is logged cut of the Website of the present invention.

References (Reference Sources)

The process for entering a reference initially starts with the jobseeker registering the Reference Source. The jobseeker then requests that the inventive Website e-mail a message and Login to the Reference Source. Both of these steps are described in the above Jobseekers section.

Figure 4K:
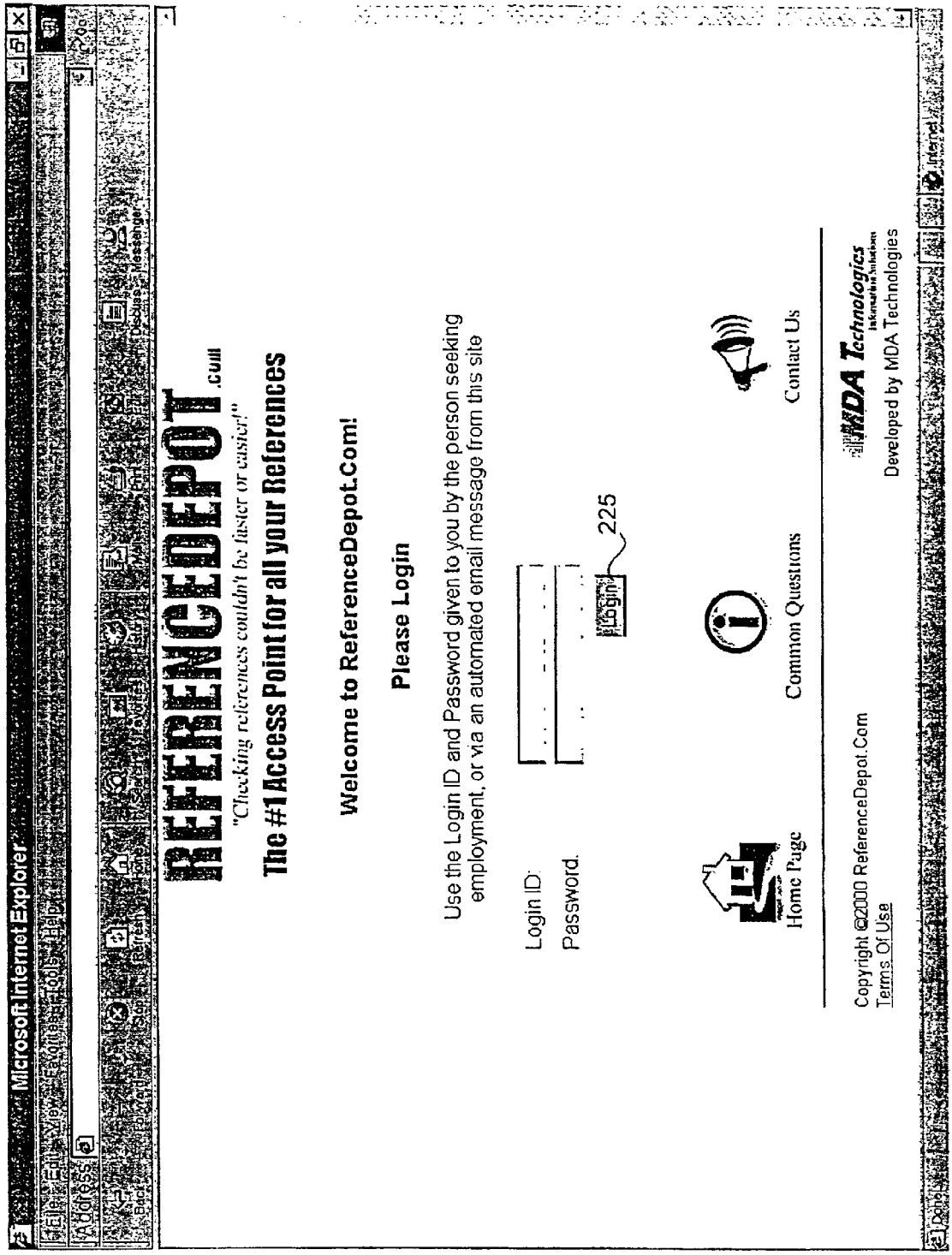
FIG. 4K is a Website screen illustrating the Reference Source Login procedure according to the present invention.
Figure 4M:
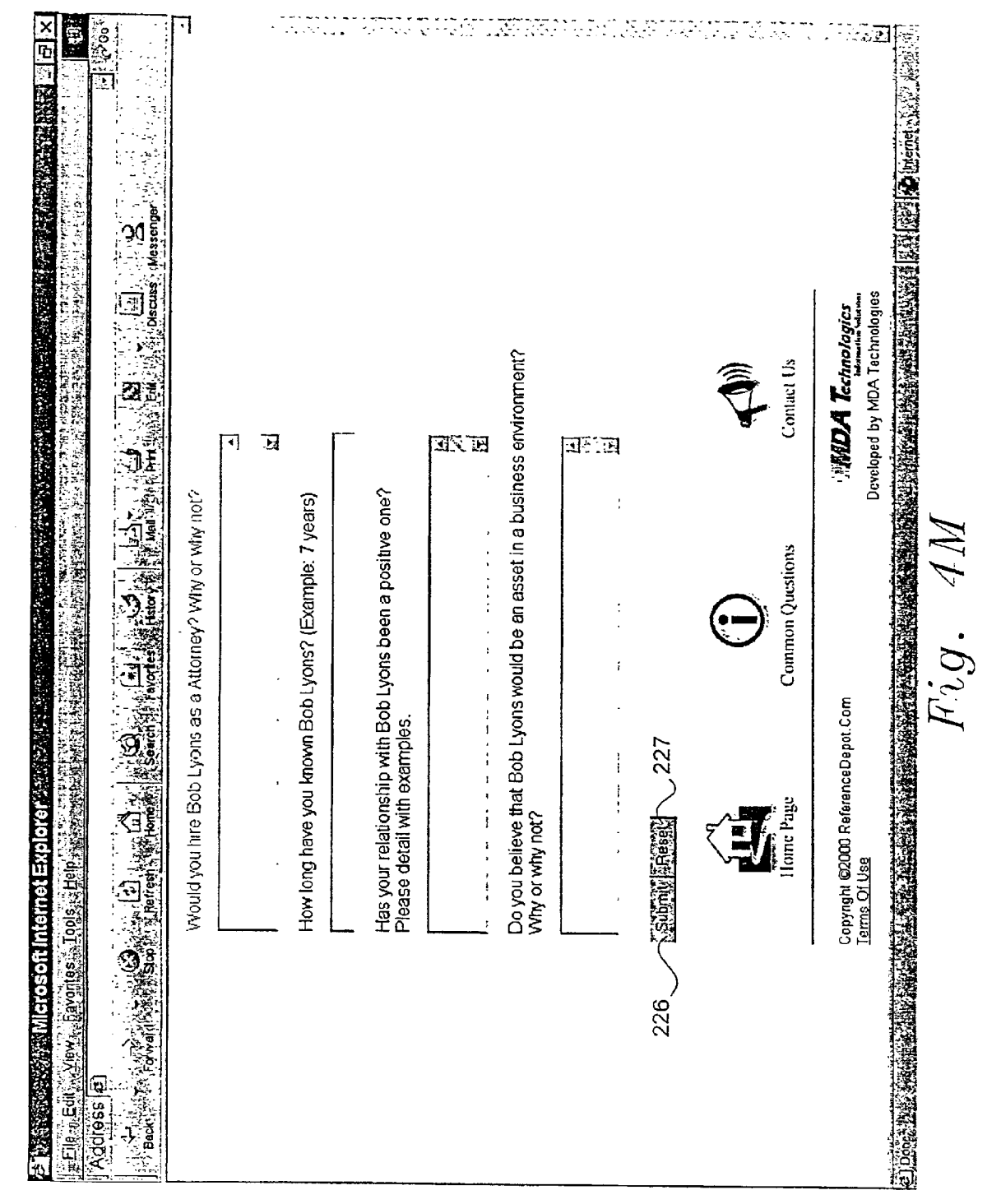
Figure 4P:
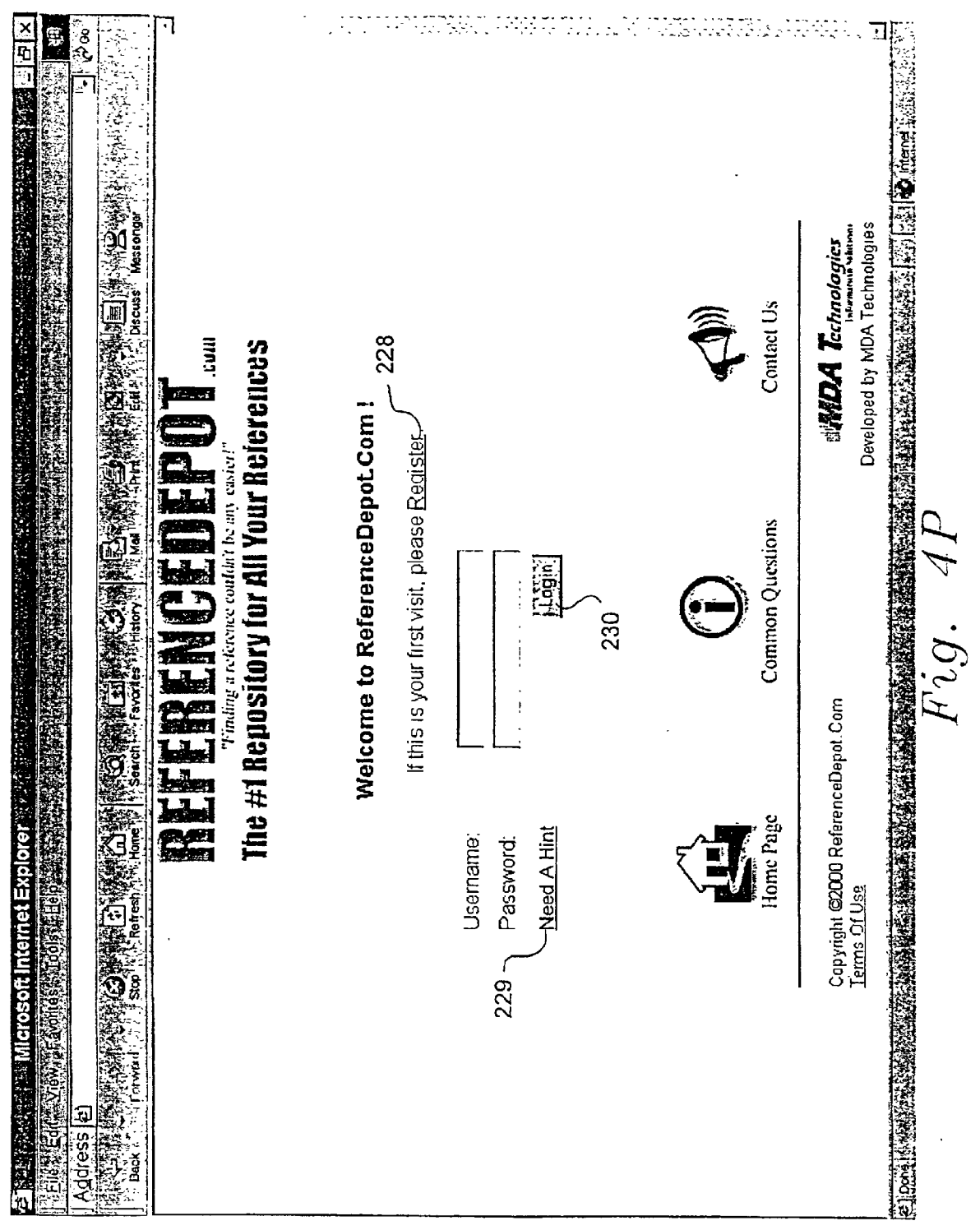

The first step for the Reference Source is to access the inventive Website home page (FIG. 4A). The Reference Source then clicks the References button 203 to begin the login process. Button 203 on the home page takes the user to the Reference Login screen (FIG. 4K). The Reference Source should enter the Login ID and password provided to them via the e-mail from the inventive Website (FIG. 4G). This unique ID and password will allow the Reference Source to enter the type of reference already defined by the jobseeker (i.e., Professional, Personal, or Letter). Upon clicking the Login button 225 on the Reference Login screen (FIG. 4K), the Reference Source is taken to a Reference Info Questions screen such as the one illustrated in FIG. 4L. The questions that are displayed in FIG. 4L are those related to a Professional Reference. If this is the type of reference that the Reference Source provides, the Reference Source will then answer each question using the tab key or mouse to move between fields. The prompts on the screen remind the Reference Source to carefully review his or her entered information before saving the screen, as they will be unable to modify the information after that time. The Reference Source will also be given the capability to print this reference in the same format that will be delivered to the prospective Recruiter/Employer.

If the Reference Source needs to re-enter or start over before saving the information, the Reset button 227 can be clicked to clear the form. If the Reference Source is satisfied with his or her responses, he or she should click the Submit button 226 to save the reference upon logout of the Website. The reference information that the Reference Source provides is saved as a record in the database with a date-time stamp and cannot be modified by the Reference Source or others after the submission. When the Submit button is clicked, the user will be taken to the Reference Thank-You screen (FIG. 4O). At this point the user is logged out of the Website.

If the type of reference to be provided by the Reference Source is a Personal Reference, then the user will see a screen similar to FIG. 4M when clicking the Login button 225 from the Reference Login screen (FIG. 4K). The Reference Source should answer the personal related questions, check to ensure he or she is satisfied with the responses, and click the Submit button 226 to save the results. If the type of reference is a Letter of Reference, the user will see a screen similar to FIG. 4N when logging into the Website. The Reference Source should type in the "letter of reference" as he or she would if typing the letter in a word processing software. The user will be allowed to cut and paste an already created letter into the text box if desired. Upon completion of the letter, the Reference Source should review the text and click the Submit button.

Employers (Recruiter/Employer)

Figure 4Q:
FIG. 4Q is a Website screen illustrating the Recruiter/Employer Registration procedure of the present invention.

The first step for the Recruiter/Employer is to access the inventive Website home page (FIG. 4A). The Recruiter/Employer then clicks the Employers button 201 to begin the Login or registration process. Button 201 on the home page takes the user to the Employer Login screen (FIG. 4P), which will allow the user to either register or login to his or her account. If this is the first time that the Recruiter/Employer has entered this Website, he or she will need to click the Register link 228. Clicking on this link will take the Recruiter/Employer to the Employer Registration screen (FIG. 4Q). The Recruiter/Employer must complete the required fields, which are marked with an asterisk (*), before the registration process is complete. The Recruiter/Employer is able to use the tab key or mouse to move between the fields. When the Recruiter/Employer has completed all the required fields, the user then clicks the Register button 231 on the Employer Registration screen (FIG. 4Q). If the user needs to re-enter or start over before clicking the register button, the Reset Form button 232 can be clicked to clear the form.

Figure 4R:
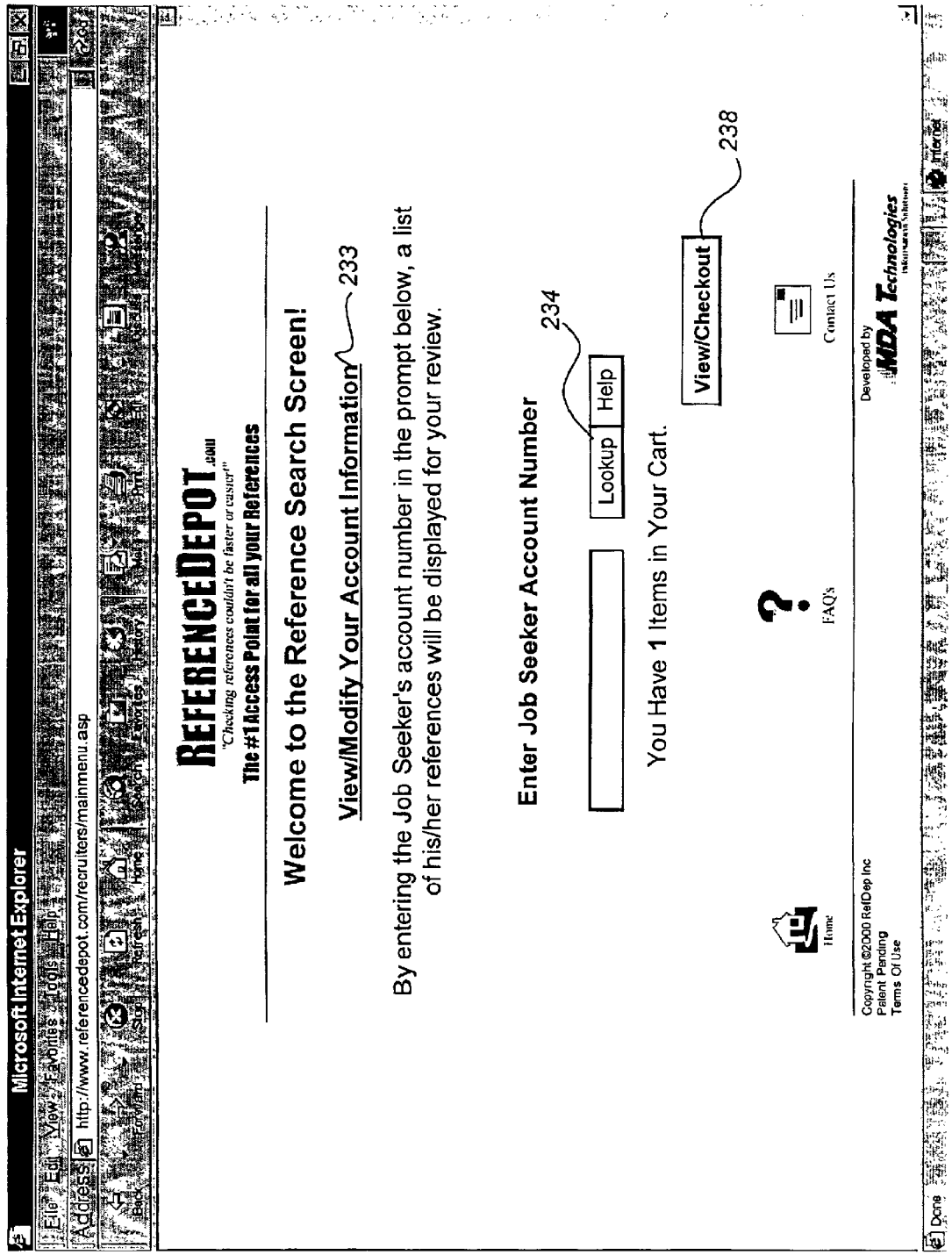
FIG. 4R is a Website screen illustrating the Recruiter/Employer main menu according to the present invention.

Once the Recruiter/Employer has clicked the Register button 231 on the Employer Registration screen (FIG. 4Q), he or she will be taken to the Recruiter/Employer main menu which is illustrated in FIG. 4R. This screen allows the user to view his or her registered account information and Lookup Jobseekers by user name or account number.

The Recruiter/Employer begins the process of viewing the jobseeker's references by entering the Jobseekers account number into the prompt provided on the Recruiter/employer screen (FIG. 4R) and clicking the Look up button 234. The prospective Recruiter or Employer has received this account number directly from the jobseeker or via his or her resume. Pressing the Lookup button 234 takes the user to the Recruiter Lookup screen (FIG. 4S).

Figure 4S:
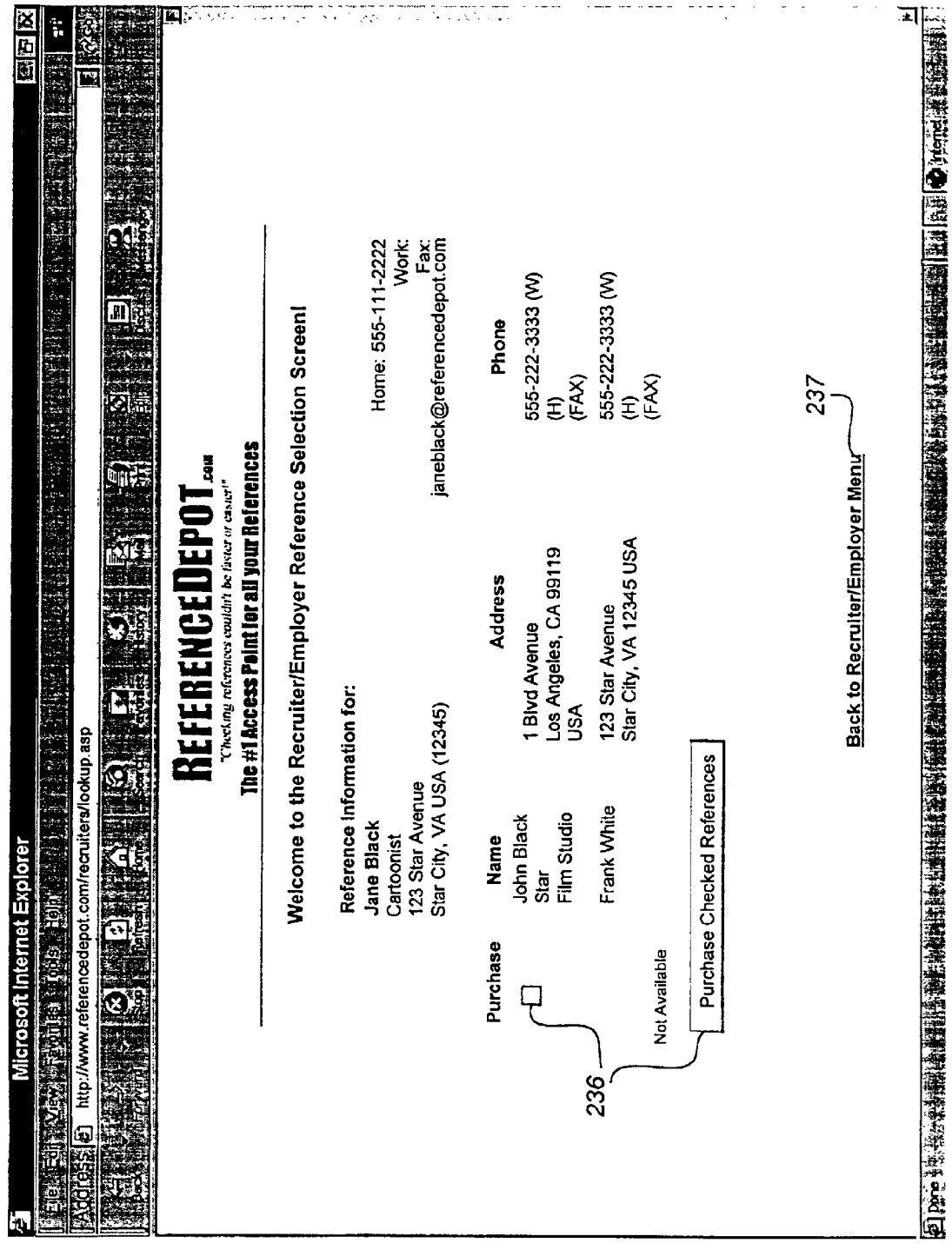
FIG. 4S is a Website screen illustrating the Recruiter/Employer Reference Source Lookup procedure according to the present invention.
Figure 4U:
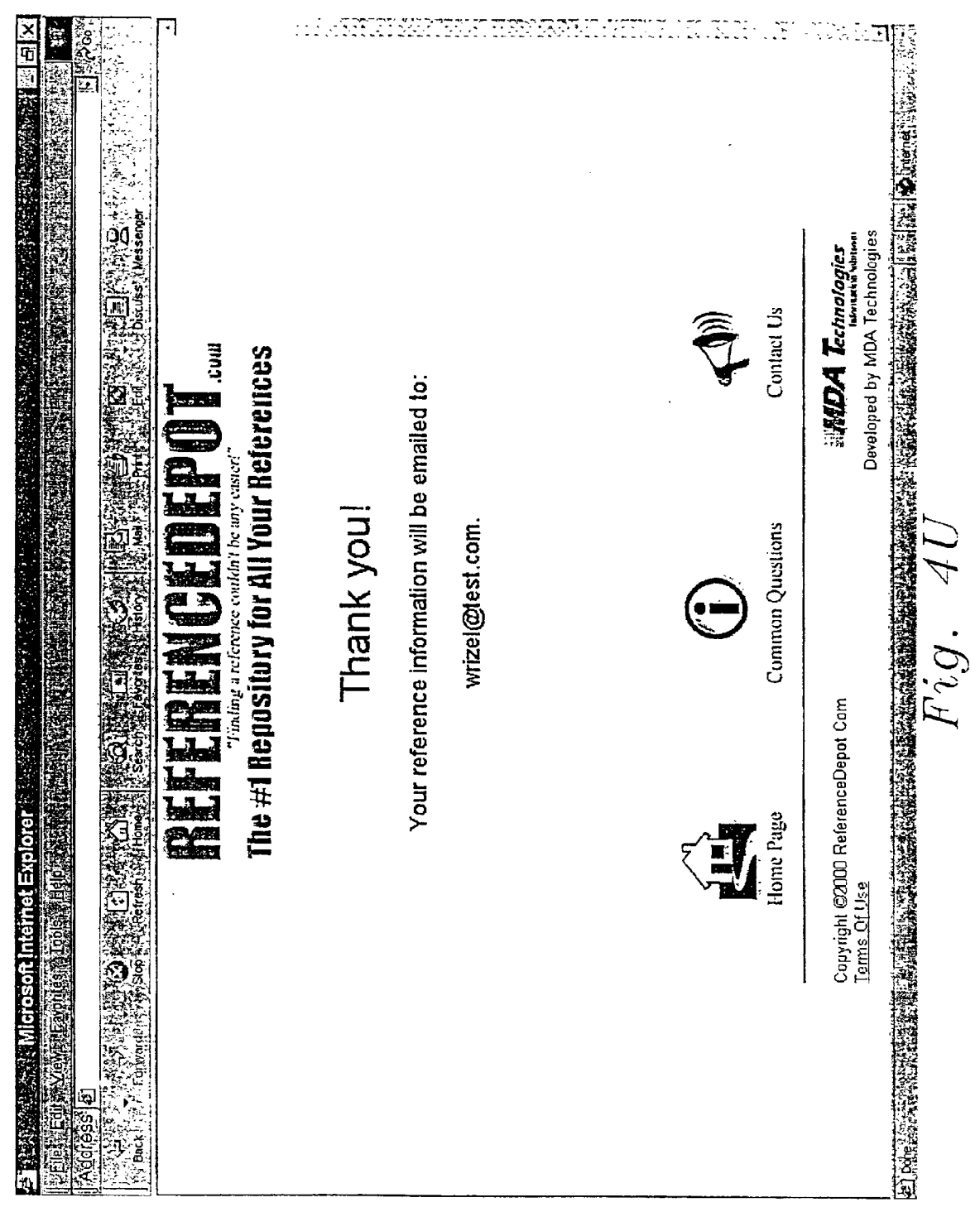

FIG. 4S, the Recruiter Lookup screen, illustrates the summary Reference Source information that the Recruiter/Employer would be able to view regarding the jobseeker's references. The Recruiter/Employer may print out this summary information and use it as he or she typically has by contacting the Reference Source for a reference. If the Recruiter or Employer would like to view the detailed reference provided by the Reference Source, he or she must click the box next to each Reference Source name, which places a check mark in that box, as illustrated in FIG. 4T. The Recruiter/Employer should check all desired references and then click on the Purchase Checked References button 236.

Clicking on the Purchase Checked References button 236 will return the user to the Recruiter/Employer screen (FIG. 4R) where pressing the View/Checkout button takes the user into several screens related to the purchasing of the reference detail. These screens will request the billing and charge card information of the Recruiter/Employer purchasing the references. These screens are similar to other purchasing processes currently used on the Worldwide Web.

Figure 4V:
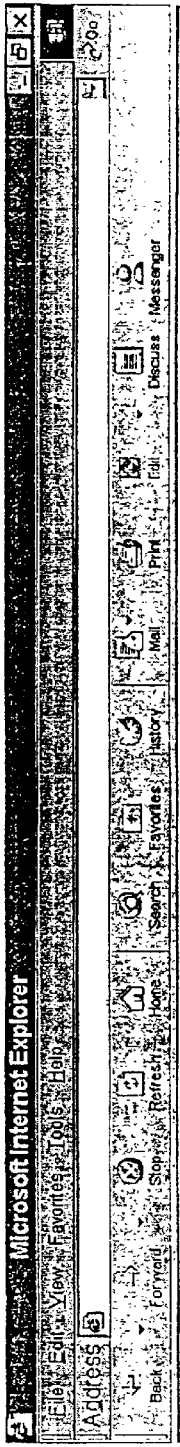
FIG. 4V is a Website screen illustrating a printout of a Reference detail or document as purchased according to the present invention.
Figure 4W:
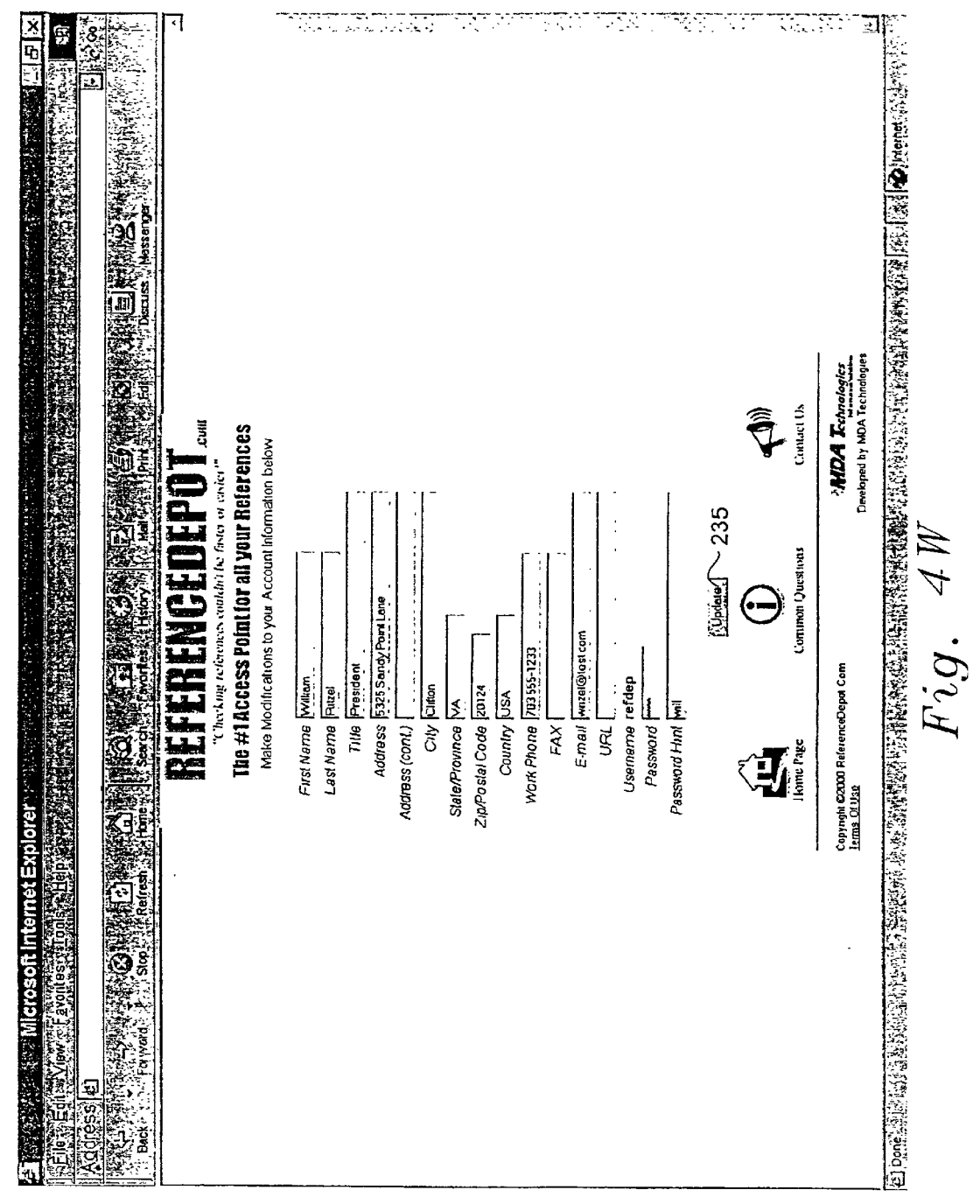

When the purchasing process is complete, the Recruiter/Employer Thank-You screen illustrated in FIG. 4U will be displayed. This screen informs the Recruiter/Employer that the information he or she has purchased regarding the jobseeker will be e-mailed to the e-mail address he or she provided during the registration process. The Recruiter/Employer will receive a printout of the reference detail, which is similar to that illustrated in FIG. 4V. This report or printout can be used to document the Recruiter/Employer's verification of the jobseeker's references.

When the Recruiter/Employer wishes to return to the inventive Website in the future, he or she will begin at the home page (FIG. 4A) and click on the Employers button 201. At the Employer Login screen (FIG. 4P), the Recruiter/Employer should enter his or her User name and Password and then click on the Login button 230. If the user has forgotten his or her password, pressing the Need a Hint link 229 will display the password hint provided by the Recruiter/Employer during the initial registration process. The Recruiter/Employer will be taken to the Recruiter/Employer main menu (FIG. 4R) after clicking the login button on FIG. 4P.

At this point, the Recruiter/Employer can use the View/Modify Account Info link 233 to update any of his or her demographic information (see FIG. 4W). After the Recruiter/Employer updates the fields on the Recruiter Acct Info screen (FIG. 4W), he or she must click on the Update button 235 to save the information and return to the Recruiter/Employer main menu.

If the Recruiter/Employer's demographic information does not need to be updated, the user begins the Jobseeker lookup process by entering the Jobseeker's account number and clicking the Lookup button 234. If the Recruiter/Employer views the summary Reference Source information for the jobseeker provided on the Recruiter Lookup screen (FIG. 4S) and does not wish to purchase the reference detail, he or she may click on the Back to Recruiter/Employer Menu button 237. The user will be returned to the Recruiter/Employer main menu screen (FIG. 4R) and exit the Website.

Security measures and features, such as computer software, personal hardware, and Internet hardware, and known in the art are included in the Inventive system, method of doing business, and provided in the operation of the Website, and form no part of the invention as fully disclosed above.

It is to be understood that the present invention is not limited to the embodiment described above, but encompasses any and all embodiments within the scope of the following claims.

I claim:

1. A reference repository system for jobseekers on the Internet comprising:
    a prospective employee or jobseeker computer in two-way communication with said Internet;
    a named reference source or author computer in communication with said Internet;
    a recruiter/employer computer in two-way communication said Internet;
    an employee reference server in two-way communication said Internet;
    and a data bank in two-way communication with said employee reference server;
    whereby the jobseeker, through their said computer, registers their demographic information and references with said reference server for entry into said database, said employee reference server, upon receiving each said reference from the jobseeker, sends an e-mail to said reference source requesting a reference document for said jobseeker;
    whereby said reference source, through their said computer, provides said reference document to said employee reference server for entry into said database;
    whereby said recruiter/employer, accesses a list designating said jobseeker references and chooses and receives desired jobseeker reference documents;
    and whereby said recruiter/employer, through their said gains access to a list of documents existing in said data base through said employee reference server, selects desired reference documents, and receives images of said desired reference documents upon payment of a preset fee.

2. The reference repository system of claim 1, further comprising
    means establishing a merchant account in two-way communication with said employee reference server, over the internet
    said recruiter/employer computer, whereby said recruiter/employer purchases said desired reference documents images for e-mail
    delivery from said database of said employee reference Server.

3. A method of providing a repository for jobseekers' references on the Internet comprising:
    providing an Internet Home Page in a Website on the World Wide Web for access to said repository by jobseekers, reference sources, and recruiters or employers;
    providing a process for a jobseeker, accessible from said Home Page, for registration of his or her demographic information, registration of his or her reference source, and ability to update and maintain his or her account information;
    providing a process for a reference source, accessible from said Home Page, for Login that will then provide a series of questions for the personal or professional reference or a space to enter a letter of reference, thus forming a reference document for said Jobseeker; and
    providing a process for a Recruiter/Employer, accessible from said Home Page, for registration for his or her demographic information, lookup of the Jobseeker's reference, and purchase of a detailed reference document for the Jobseeker's reference.

4. The method of claim 3, wherein said Jobseeker is provided a process for being assigned a password, said password allowing said Jobseeker to store and modify his or her said demographic information and a list of said reference sources.

5. The method of claim 4, wherein said Recruiter/Employer is provided a process for accepting terms of use and being assigned a user identification number and a password for entering into said reference list site.

6. The method of claim 5, wherein said Recruiter/Employer is provided a process to select and purchase formatted reference documents from said reference list site, said selected reference documents being automatically e-mailed to said Recruiter/Employer.

7. The method of claim 6, wherein said Recruiter/Employer is provided a process for making a checkout list of desired reference documents and then provided a process to purchase the references on said checkout list.

8. The method of claim 7, wherein said Recruiter/Employer is provided a process for making a checkout list from more than one jobseeker by successively entering jobseeker account numbers and selecting references for inclusion on said checkout list.

9. The method of claim 8, wherein a process is provided for said Recruiter/Employer to open a merchant account, whereby said Recruiter/Employer purchases said selected documents on said checkout list.

10. The method of claim 3, wherein said Jobseeker is provided a process for registering demographic information.

11. The method of claim 10, wherein said Jobseeker is provided a process for accepting terms of use.

12. The method of claim 3, wherein said Jobseeker is provided a process for adding or removing references and reference documents from availability to Recruiters/Employers.

13. The method of claim 3, wherein said Reference Source is provided a process for permanently entering a reference document.

14. The method of claim 13, wherein said website assigns a unique user identification and a unique password for each Reference Source.

15. The method of claim 14, wherein a process is provided precluding any of said reference source, said jobseeker and said Recruiter/Employer from altering a reference document once the Reference Source enters the reference document into said website.

16. A method carried out by a server including a memory, and including a database defined by the memory, the method comprising:

communicating to a first machine a plurality of fields relevant to a jobseeker's demographic information, acceptance of terms of use, list of references, and registration of reference documents;

receiving information within said fields provided by said jobseeker from said first machine;

storing in a database said information received from said first machine provided by said Jobseeker;

communicating to a second machine a plurality of fields relevant to a Reference Source;

receiving information within said fields provided by said Reference Source from said second machine;

storing in a database said information received from said second machine provided by said Reference Source, including a reference document;

communicating to a third machine a plurality of fields relevant to a Recruiter/Employer;

receiving information within said fields provided by said Recruiter/Employer;

storing in a database said information received from said third machine provided by said Recruiter/Employer, including e-mail address, request for said list of references, designation of desired reference documents from said list of reference;

sending at least one e-mail to said Recruiter/Employer containing at least one reference document selected from said list of documents; and sending said Recruiter/Employer an invoice corresponding to the number of reference documents selected and e-mailed thereto.

17. The method of claim 16, further comprising the step of establishing a merchant account for each Recruiter/Employer if indicated by said Recruiter/Employer, and communicating to said merchant account information received from said Recruiter/Employer information as to number of said reference documents ordered thereby.

18. The method of claim 16, wherein said Jobseeker supplies an account number to said Recruiter/Employer for inclusion in said receipt of information step from said third machine, whereby access to said reference list and said reference documents is provided.

19. The method of claim 16, wherein said Jobseeker is provided access to said list of references for amending same.

20. The method of claim 16, wherein each of said reference documents, once registered by said Reference Source and entered into said database, is protected from amendment by either of said Jobseeker, said Reference Source, and said Recruiter/Employer.

* * * * *